US011955708B2

(12) United States Patent
Park et al.

(10) Patent No.: US 11,955,708 B2
(45) Date of Patent: Apr. 9, 2024

(54) ELECTRONIC DEVICE EQUIPPED WITH TRANSPARENT ANTENNA

(71) Applicant: LG ELECTRONICS INC., Seoul (KR)

(72) Inventors: Byeongyong Park, Seoul (KR); Seungmin Woo, Seoul (KR); Ilnam Cho, Seoul (KR); Kukheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 17/597,751

(22) PCT Filed: Aug. 22, 2019

(86) PCT No.: PCT/KR2019/010673
§ 371 (c)(1),
(2) Date: Jan. 21, 2022

(87) PCT Pub. No.: WO2021/033807
PCT Pub. Date: Feb. 25, 2021

(65) Prior Publication Data
US 2022/0255215 A1 Aug. 11, 2022

(51) Int. Cl.
*H01Q 1/52* (2006.01)
*H01Q 1/24* (2006.01)

(52) U.S. Cl.
CPC ............... *H01Q 1/52* (2013.01); *H01Q 1/243* (2013.01)

(58) Field of Classification Search
CPC ................................. H01Q 1/52; H01Q 1/243
See application file for complete search history.

(56) References Cited

U.S. PATENT DOCUMENTS

2022/0006180 A1* 1/2022 Oh ......................... H01Q 1/364

FOREIGN PATENT DOCUMENTS

KR 2017-0115870 10/2017
KR 10-1973742 4/2019
(Continued)

OTHER PUBLICATIONS

Korean Intellectual Property Office Application No. 10-2021-7031601, Office Action dated Sep. 16, 2022, 5 pages.
(Continued)

*Primary Examiner* — Graham P Smith
(74) *Attorney, Agent, or Firm* — LEE, HONG, DEGERMAN, KANG & WAIMEY

(57) ABSTRACT

Provided, according to the present invention, is an electronic device equipped with a transparent antenna for 5G communication. The electronic device comprises: an antenna embedded and operating in a display, and composed of first metal mesh lines formed in a first direction; a substrate on which the antenna is disposed and which is configured to operate dielectrically with respect to the antenna; and a ground layer disposed on the bottom portion of the substrate and configured to operate on the ground with respect to the antenna. Here, an inner area of the ground layer corresponding to an area in which the antenna is disposed is composed of second metal mesh lines formed in a second direction different from the first direction, wherein a moiré effect is mitigated in the transparent antenna structure by means of the metal mesh lines overlapping in the antenna area and the ground area, thereby improving visibility.

12 Claims, 15 Drawing Sheets

<BOTTOM VIEW>

(56) References Cited

FOREIGN PATENT DOCUMENTS

| | | |
|---|---|---|
| KR | 2019-0071411 | 6/2019 |
| KR | 2019-0087187 | 7/2019 |
| WO | 2006-106982 | 10/2006 |
| WO | 2011089219 | 7/2011 |

OTHER PUBLICATIONS

PCT International Application No. PCT/KR2019/010673, International Search Report dated May 22, 2020, 4 pages.
Park et al., "An Optically Invisible Antenna-on-Display (AoD) Concept for Millimeter-wave 5G Cellular Devices," IEEE Transactions on Antennas and Propagation, vol. 67, Issue: 5, Feb. 2019, 13 pages.
Martin et al., "Improvement of 60 GHz Transparent Patch Antenna Array Performance Through Specific Double-Sided Micrometric Mesh Metal Technology," IEEE Access, vol. 7, Dec. 2018, 7 pages.
Lombardi et al., "Copper Transparent Antennas on Flexible Glass by Subtractive and Semi-Additive Fabrication for Automotive Applications," 2018 IEEE 68th Electronic Components and Technology Conference (ECTC), Jun. 2018, 57 pages.

* cited by examiner

<BOTTOM VIEW>

<TYPE A>

(a)

<TYPE B>

(b)

<TYPE C>

(c)

ELECTRONIC DEVICE EQUIPPED WITH TRANSPARENT ANTENNA

CROSS-REFERENCE TO RELATED APPLICATIONS

This application is the National Stage filing under 35 U.S.C. 371 of International Application No. PCT/KR2019/010673, filed on Aug. 22, 2019, the contents of which is hereby incorporated by reference herein in its entirety.

TECHNICAL FIELD

The present disclosure relates to an electronic device having a transparent antenna. One detailed implementation relates to an electronic device having a transparent antenna equipped in a display.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, a 28 GHz band, a 39 GHz band, and a 64 GHz band are being considered as frequency bands to be allocated for 5G communication services in such mmWave bands. In this regard, a plurality of array antennas may be disposed in an electronic device in the mmWave bands.

In addition to the plurality of array antennas, a plurality of other antennas may be disposed in the electronic device.

Therefore, there is a need to transmit and receive signals through a front part of the electronic device while preventing interference with a plurality of existing antennas. To this end, research on a transparent antenna implemented as metal mesh lines embedded in a display of an electronic device is being conducted.

In the transparent antenna having such metal mesh structure, mesh lines of an antenna region and a ground region are overlaid with each other, which causes the moiré phenomenon and deteriorates visibility.

The moiré phenomenon may also be referred to as interference fringes, moiré fringes, and lattice fringes. This moiré phenomenon refers to fringes that are revealed according to a difference in cycles when regularly repeating shapes are repeatedly overlaid several times. On the other hand, in the transparent antenna having the metal mesh line structure, it is necessary to reduce the moiré phenomenon as a whole within a wide viewing angle range. However, there is a problem in that any specific method for alleviating the moiré phenomenon within a wide viewing angle range in the transparent antenna having the metal mesh line structure is not introduced.

DISCLOSURE OF INVENTION

Technical Problem

The present disclosure is directed to solving the aforementioned problems and other drawbacks. The present disclosure also describes mitigation of the moiré phenomenon due to overlaid metal mesh lines in an electronic device having a transparent antenna.

The present disclosure further describes mitigation of visibility deterioration due to the moiré phenomenon caused by metal mesh lines overlaid between an antenna region and a ground region.

The present disclosure further describes a mesh line structure capable of maintaining or improving antenna characteristics while improving visibility in a multi-layered metal mesh line structure.

Solution to Problem

According to one aspect of the subject matter described in this application, an electronic device having a transparent antenna for 5G communication is provided. The electronic device may include an antenna disposed in a display, and including therein first metal mesh lines formed in a first direction, a substrate having the antenna disposed thereon and configured to serve as a dielectric for the antenna, and a ground layer disposed beneath the substrate and configured to serve as a ground for the antenna. Here, second metal mesh lines formed in a second direction different from the first direction may be disposed at an inner region of the ground layer corresponding to a region where the antenna is disposed, which can mitigate the moirë phenomenon caused due to metal mesh lines overlaid at an antenna region and a ground region in a transparent antenna structure. A structure exhibiting a less change in antenna characteristics due to an alignment error of metal mesh lines between different layers in the transparent antenna structure can be provided. Since there is no need to dispose a dummy metal pattern around the antenna region, antenna efficiency can be improved and changes in antenna characteristics due to manufacturing errors can be decreased. A change in transparency according to a viewing angle can be relatively small, so that deterioration of display quality due to antennas disposed in the display can be alleviated. Visibility can be improved and antenna performance such as antenna bandwidth characteristics and the like can be enhanced in the transparent antenna structure.

In some implementations, the first metal mesh lines and the second metal mesh lines may be combined into a diamond shape.

In some implementations, the diamond shape in which the first metal mesh lines and the second metal mesh lines are combined may have a same grid size as a diamond shape formed at an outer region, not the inner region, of the ground layer.

In some implementations, the first metal mesh lines and the second metal mesh lines may be combined into a rectangular shape.

In some implementations, the rectangular shape in which the first metal mesh lines and the second metal mesh lines are combined may have a same grid size as a rectangular shape formed at an outer region, not the inner region, of the ground layer.

In some implementations, the electronic device may further include a transmission line configured to feed power to the antenna on the same layer as the antenna. An end portion of the transmission line may be connected to the antenna. The end portion may include metal mesh lines having the same shape as the shape in which the first metal mesh lines and the second metal mesh lines are combined.

In some implementations, a portion of the transmission line may be disposed on a non-transparent region of the display. The portion of the transmission line disposed on the non-transparent region may be configured as a Co-Planar Wavelength (CPW) line. The electronic device may further include a transceiver circuit connected to the portion of the transmission line configured as the CPW line and configured to transmit a 5G transmission signal to the antenna and receive a 5G reception signal from the antenna.

In some implementations, the transmission line disposed on the non-transparent region may be configured as a Co-Planar Waveguide (CPW) line structure that includes an inner conductor region configured to serve as a signal line, an outer conductor region disposed adjacent to the inner conductor region and configured to serve as a ground, and a dielectric region disposed between the inner conductor region and the outer conductor region.

In some implementations, the metal mesh lines may not be disposed at an outer region of the region where the antenna is disposed.

In some implementations, the second metal mesh lines formed in the second direction may be disposed at the inner region of the ground layer corresponding to the region where the antenna is disposed. The first metal mesh lines formed in the first direction and the second metal mesh lines formed in the second direction may be connected and disposed at an outer region of the ground layer.

In some implementations, the first metal mesh lines may be disposed on an antenna layer where the antenna is disposed. The second metal mesh lines may be complementarily disposed at the inner region of the ground layer corresponding to the region where the antenna is disposed. The first metal mesh lines and the second metal mesh lines complementary to each other are disposed at an outer region of the ground layer, so that the moiré phenomenon of a transparent antenna is reduced.

In some implementations, the antenna may further include a matching unit disposed between the antenna and a transmission line to feed power to the antenna. Metal mesh lines having a same shape as a shape in which the first metal mesh lines and the second metal mesh lines are combined may be disposed at the matching unit and the inner region of the ground layer corresponding to the matching unit.

In some implementations, an inset region may be further defined at a region adjacent to a boundary of the matching unit by partially removing the first metal mesh lines of the antenna, so as to allow impedance matching.

According to another aspect of the subject matter described in this application, an electronic device may include a display, a plurality of array antennas disposed inside the display and including metal mesh lines, a transceiver circuit connected to the array antennas through a transmission line, and configured to transmit a 5G transmission signal to the array antennas and receive a 5G reception signal from the array antennas, and a ground layer disposed beneath the antenna and configured to serve as a ground for the antenna. In some implementations, at least one of the plurality of array antennas may include therein first metal mesh lines formed in a first direction, and a remaining array antenna of the plurality of array antennas may include therein second metal mesh lines formed in a second direction different from the first direction.

In some implementations, the second metal mesh lines may be disposed at an inner region of the ground layer corresponding to the at least one array antenna, and the first metal mesh lines may be disposed at the inner region of the ground layer corresponding to the remaining array antenna. In some examples, the transceiver circuit may receive a signal through the remaining array antenna including the second metal lines when a signal received through the at least one array antenna including the first metal mesh lines has low quality.

In some implementations, the electronic device may further include a baseband processor coupled to the transceiver circuit and configured to control the transceiver circuit. Here, the baseband processor may control the transceiver circuit to perform a diversity operation or a Multi-Input/Multi-Output (MIMO) operation through the at least one array antenna and the remaining array antenna when quality of a signal received through the at least one array antenna including the first metal mesh lines and quality of a signal received through the remaining array antenna including the second metal mesh lines are equal to or higher than a threshold value.

In some implementations, a diamond shape in which the first metal mesh lines and the second metal mesh lines are combined may have a same grid size as a diamond shape formed at an outer region, not an inner region, of the ground layer.

In some implementations, the metal mesh lines may not be disposed at an outer region of a region where the array antenna is disposed.

In some implementations, the first metal mesh lines or the second metal mesh lines may be disposed at an inner region of the ground layer corresponding to the region where the array antenna is disposed. The first metal mesh lines formed in the first direction and the second metal mesh lines formed in the second direction may be connected and disposed at an outer region of the ground layer.

In some implementations, a moiré phenomenon of a transparent antenna may be reduced by the first metal mesh lines of an antenna layer on which the at least one array antenna is disposed and the second metal mesh lines disposed on the ground layer to be complementary to the first metal mesh lines. The moiré phenomenon of the transparent antenna may also be reduced by the second metal mesh lines of the antenna layer on which the remaining array antenna is disposed and the first metal mesh lines disposed on the ground layer to be complementary to the second metal mesh lines.

Advantageous Effects of Invention

Hereinafter, effects of the electronic device having the transparent antenna having the complementary mesh structure will be described.

In some implementations, visibility can be improved by mitigating the moiré phenomenon caused due to metal mesh lines overlaid on an antenna region and a ground region in a transparent antenna structure.

In some implementations, a structure exhibiting a less change in antenna characteristics due to an alignment error of metal mesh lines between different layers in a transparent antenna structure can be provided.

In some implementations, dummy metal patterns do not need to be disposed around an antenna region, which can improve antenna efficiency and reducing changes in antenna characteristics due to manufacturing errors.

In some implementations, a change in transparency according to a viewing angle can be relatively small, so that deterioration of display quality due to antennas disposed in the display can be alleviated.

In some implementations, visibility can be improved and antenna performance such as antenna bandwidth characteristics and the like can be enhanced in a transparent antenna structure.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

MODE FOR THE INVENTION

Figure 1A:
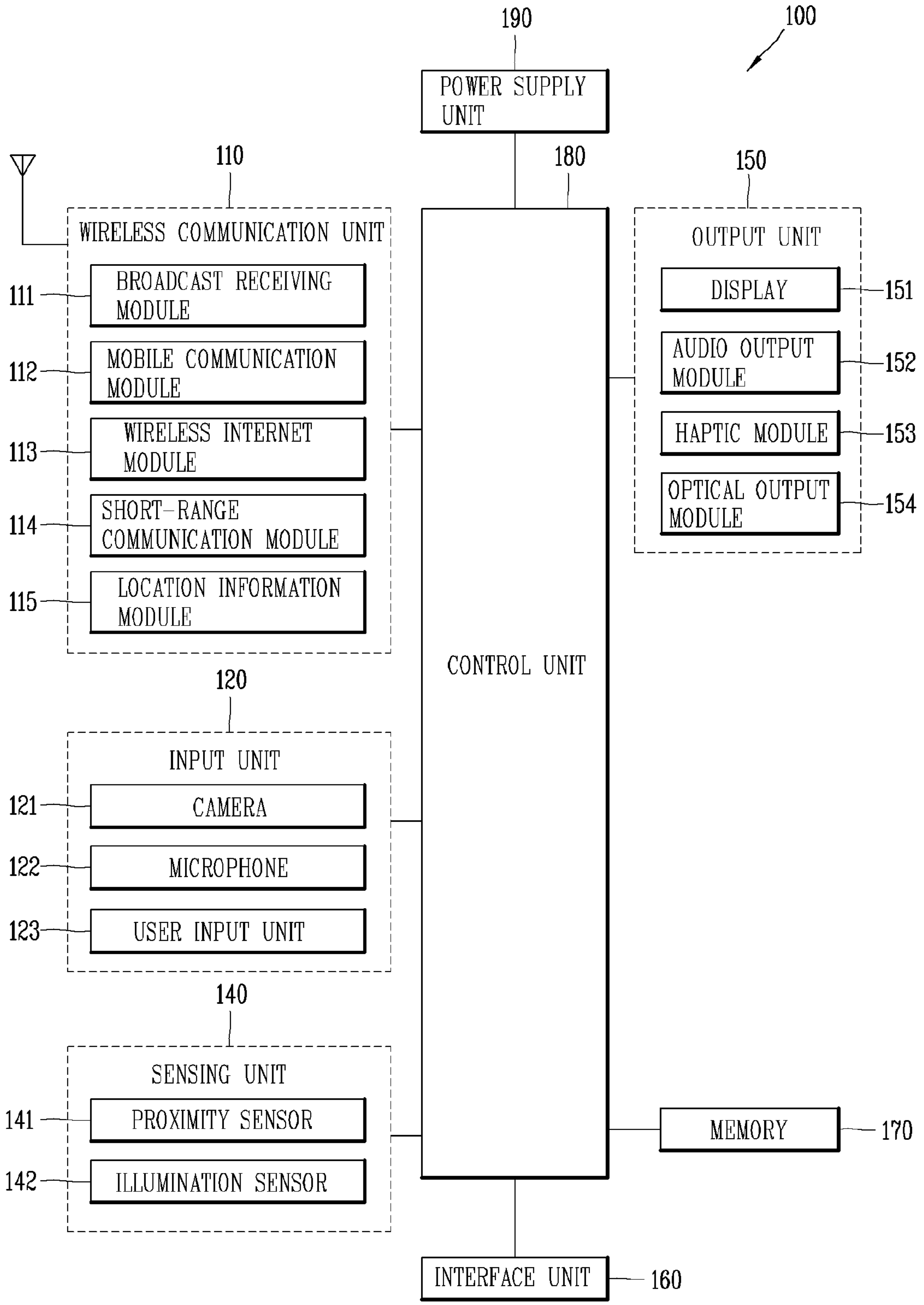
FIG. 1A is a block diagram of an electronic device in accordance with one implementation.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMOs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
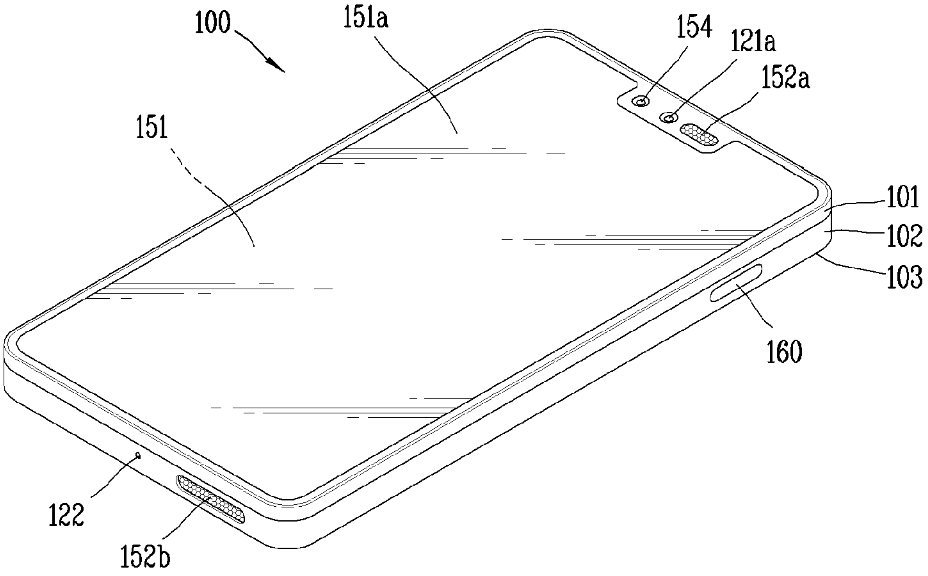
FIGS. 1B and 1C are conceptual views illustrating one example of the electronic device, viewed from different directions.
Figure 1C:
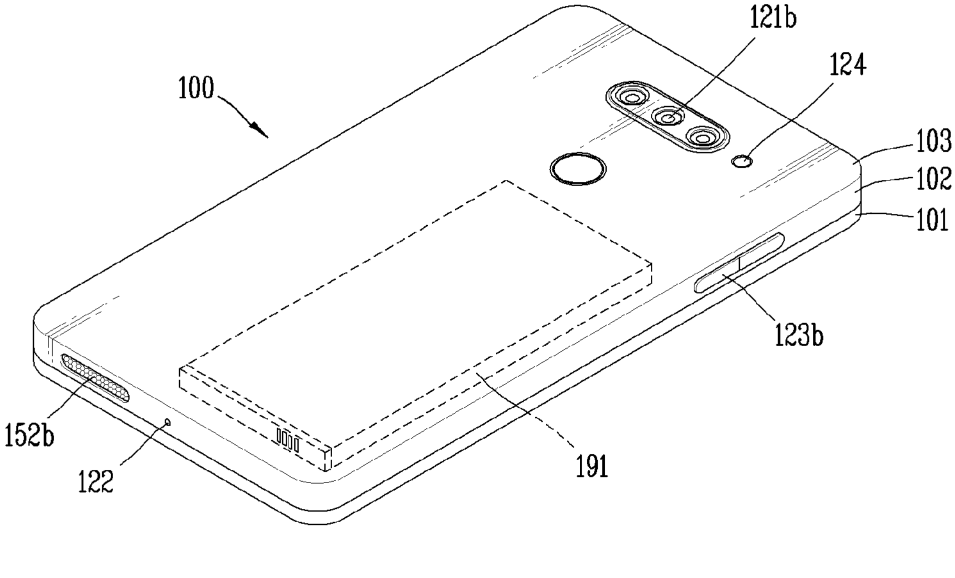

Referring to FIGS. 1A to 1C, FIG. 1A is a block diagram of an electronic device in accordance with one implementation of the present disclosure, and FIGS. 1B and 1C are conceptual views illustrating one example of an electronic device according to the present disclosure, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the portable electronic device may be implemented on the portable electronic device by an activation of at least one application program stored in the memory 170.

Referring to FIGS. 1B and 1C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a flip type, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. Meanwhile, the rear cover 103 may include an opening for externally exposing a camera 121*b* or an audio output module 152*b*.

The electronic device 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

In this way, the display unit 151 may form a touch screen together with the touch sensor, and in this case, the touch screen may function as the user input unit (123, see FIG. 1A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may output light for indicating an event generation. Examples of such events may include a message reception, a call signal reception, a missed call, an alarm, a schedule alarm, an email reception, information reception through an application, and the like. When a user has checked a generated event, the control unit 180 may control the optical output module 154 to stop the light output.

The first camera 121*a* may process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display unit 151 or the user input unit 123.

The microphone 122 may be provided at a plurality of places, and configured to receive stereo sounds. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject. The second audio output module 152*b* may further be disposed on the terminal body.

The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of embodiments of a multi-transmission system and an electronic device having the same, specifically, a power amplifier in a heterogeneous radio system and an electronic device having the same according to the present disclosure, with reference to the accompanying drawings. It will be apparent to those skilled in the art that the present disclosure may be embodied in other specific forms without departing from the idea or essential characteristics thereof.

Figure 2:
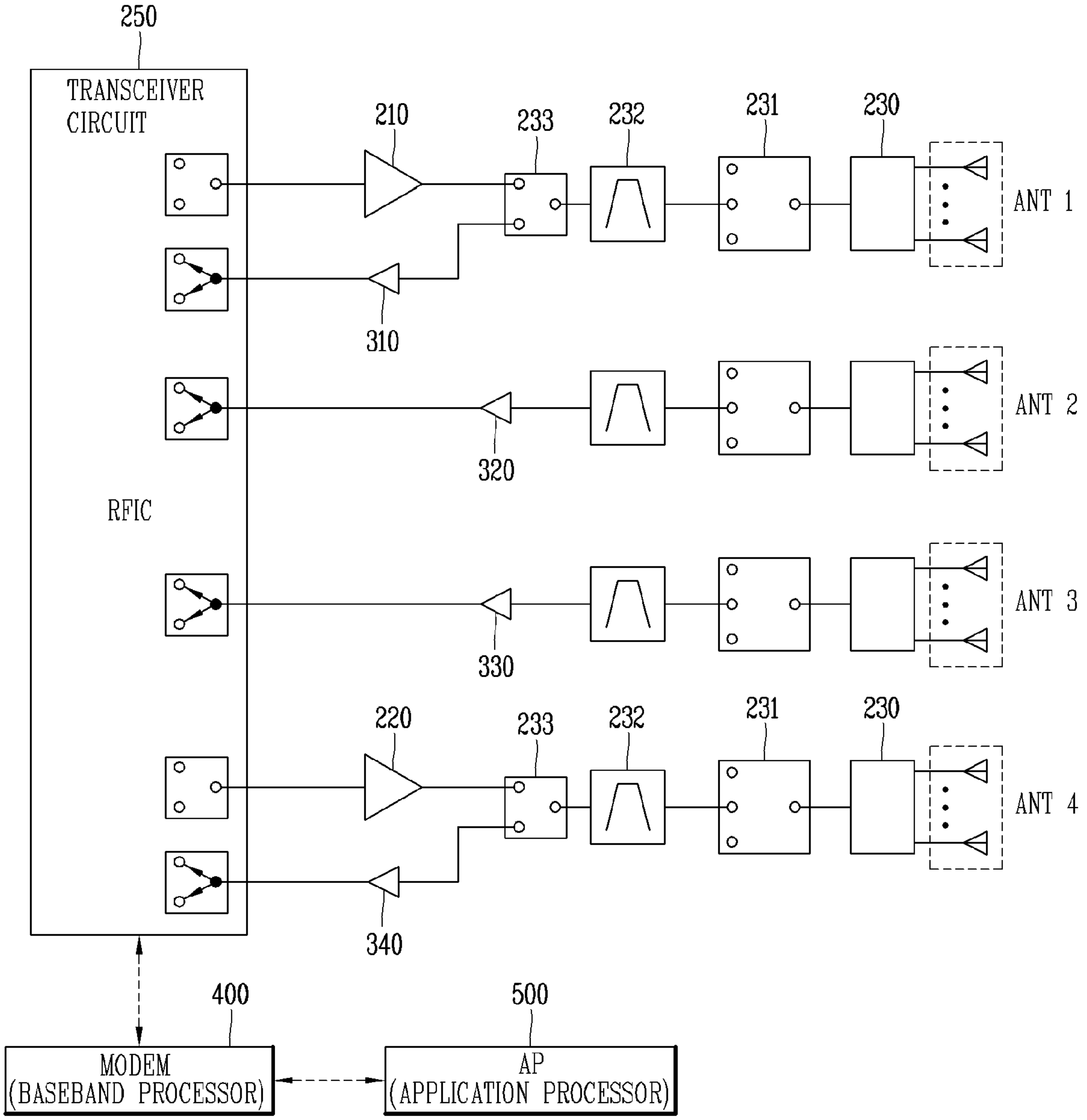
FIG. 2 is a block diagram illustrating an exemplary configuration of a wireless communication unit of an electronic device operable in a plurality of wireless communication systems according to the present disclosure.

FIG. 2 is a block diagram illustrating a configuration of a wireless communication unit of an electronic device operable in a plurality of wireless communication systems according to an embodiment. Referring to FIG. 2, the electronic device may include a first power amplifier 210, a second power amplifier 220, and an RFIC 250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure is not limited thereto and may be implemented in the form of a chip that is physically separated according to an application.

Meanwhile, the electronic device includes a plurality of low noise amplifiers (LNAs) 410 to 440 in the receiver. Here, the first power amplifier 210, the second power amplifier 220, a power and phase controller 230, a controller 250, and the plurality of low noise amplifiers 310 to 340 may all be operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but the present disclosure may not be limited thereto. The RFIC 250 may be configured as a 4G/5G separate type according to an application. When the RFIC 250 is configured as a 4G/5G integration type, it is advantageous in terms of synchronization between 4G/5G circuits, and also there is an advantage that control signaling by the modem 400 can be simplified.

On the other hand, when the RFIC 250 is configured as a 4G/5G separation type, it may be referred to as a 4G RFIC and a 5G RFIC, respectively. In particular, when there is a great band difference between the 5G band and the 4G band, such as when the 5G band is configured as a millimeter wave band, the RFIC 250 may be configured as a 4G/5G separated type. As such, when the RFIC 250 is configured as a 4G/5G separation type, there is an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 500 may be configured to control the operation of each component of the electronic device. Specifically, the application processor (AP) 500 may control the operation of each component of the electronic device through the modem 400.

For example, the modem 400 may be controlled through a power management IC (PMIC) for low power operation of the electronic device. Accordingly, the modem 400 may operate power circuits of a transmitter and a receiver through the RFIC 250 in a low power mode.

In this regard, when it is determined that the electronic device is in an idle mode, the application processor (AP) 500 may control the RFIC 250 through the modem 400 as follows. For example, when the electronic device is in an idle mode, the application processor 280 may control the RFIC 250 through the modem 400, such that at least one of the first and second power amplifiers 110 and 120 operates in the low power mode or is turned off.

According to another implementation, the application processor (AP) 500 may control the modem 300 to enable wireless communication capable of performing low power communication when the electronic device is in a low battery mode. For example, when the electronic device is connected to a plurality of entities among a 4G base station, a 5G base station, and an access point, the application processor (AP) 500 may control the modem 400 to enable wireless communication at the lowest power. Accordingly, even though a throughput is slightly sacrificed, the application processor (AP) 500 may control the modem 400 and the RFIC 250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 500 may control the modem 400 to receive data through both the 4G base station and the 5G base station according to the remaining battery capacity and the available radio resource information. In this case, the application processor (AP) 500 may receive the remaining battery information from the PMIC, and the available radio resource information from the modem 400. Accordingly, when the remaining battery capacity and the available radio resources are sufficient, the application processor (AP) 500 may control the modem 400 and the RFIC 250 to receive data through both the 4G base station and 5G base station.

Meanwhile, in a multi-transceiving system of FIG. 2, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in either the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is the millimeter wave (mmWave) band, each of the plurality of antennas may be configured as an array antenna in the millimeter wave band.

In some examples, the power and phase controller 230 may control magnitude and/or phase of a signal applied to each of the antennas ANT1 to ANT4. In this regard, the power and phase controller 230 may control the magnitude and/or phase of a signal even when each of the antennas ANT1 to ANT4 operates in a mmWave band. Specifically, the power and phase controller 230 may control the magnitude and/or phase of a signal applied to each antenna element of each of the array antennas ANT1 to ANT4.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device that is operable in the plurality of wireless communication systems according to an embodiment may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, signals in a reception band received through the antennas ANT1 and ANT4 are received by the low noise amplifiers 310 and 340 through a second output port of the duplexer 231.

The filter 232 may be configured to pass signals in a transmission band or a reception band and block signals in the remaining bands. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. Here, the transmission signal and the reception signal are signals of the same frequency band, and thus the duplexer 231 may be implemented in the form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device according to the present disclosure may further include a modem 400 corresponding to the controller. In this case, the RFIC 250 and the modem 400 may be referred to as a first controller (or a first processor) and a second controller (a second processor), respectively. On the other hand, the RFIC 250 and the modem 400 may be implemented as physically separated circuits. Alternatively, the RFIC 250 and the modem 400 may be logically or functionally distinguished from each other on one physical circuit.

The modem 400 may perform controlling of signal transmission and reception and processing of signals through different communication systems using the RFID 250. The modem 400 may acquire control information from a 4G base station and/or a 5G base station. Here, the control information may be received through a physical downlink control channel (PDCCH), but may not be limited thereto.

The modem 400 may control the RFIC 250 to transmit and/or receive signals through the first communication system and/or the second communication system at specific time and frequency resources. Accordingly, the RFIC 250 may control transmission circuits including the first and second power amplifiers 210 and 220 to transmit a 4G signal or a 5G signal in a specific time interval. In addition, the RFIC 250 may control reception circuits including the first to fourth low noise amplifiers 310 to 340 to receive a 4G signal or a 5G signal at a specific time interval.

Hereinafter, detailed operations and functions of an electronic device having a transparent antenna according to the present disclosure that includes the multi-transceiving system as illustrated in FIG. 2 will be discussed.

In a 5G communication system according to an example, a 5G frequency band may be a higher frequency band than a Sub6 band. For example, the 5G frequency band may be a millimeter wave band, but the present disclosure is not limited thereto and may be changed according to an application.

Figure 3:
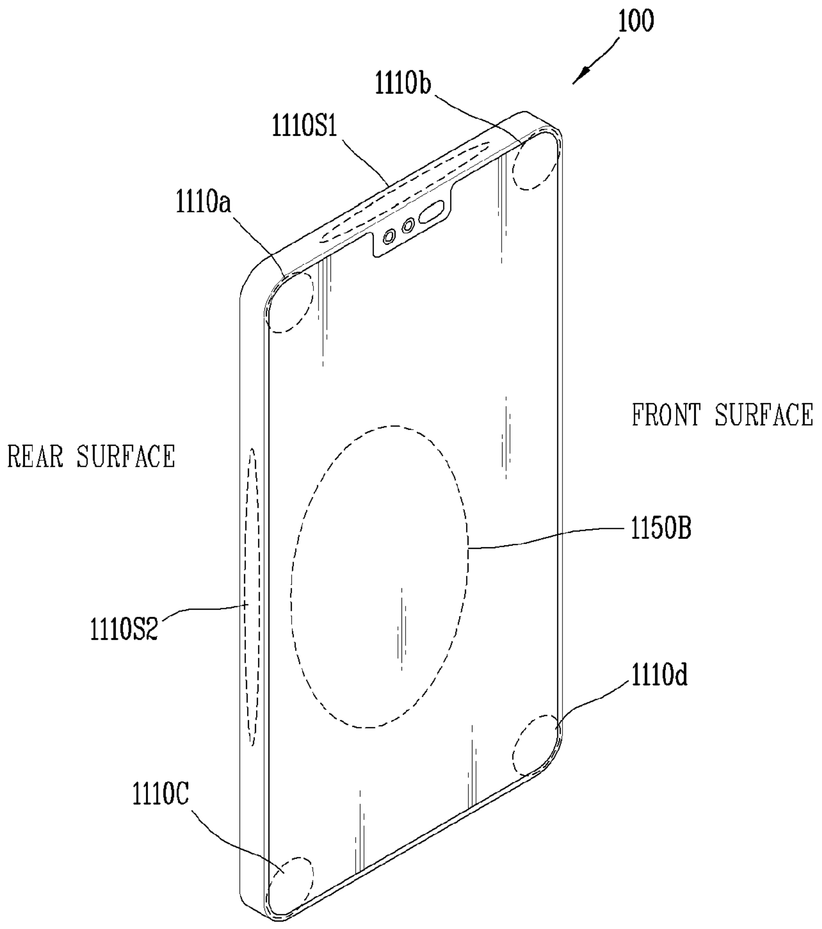
FIG. 3 illustrates an example of a configuration in which a plurality of antennas of the electronic device can be arranged.

FIG. 3 illustrates an exemplary configuration in which a plurality of antennas of the electronic device can be arranged. Referring to FIG. 3, a plurality of antennas 1110*a* to 1110*d* may be arranged on a front surface of the electronic device 100. Here, the plurality of antennas 1110*a* to 1110*d* disposed on the front surface of the electronic device 100 may be implemented as transparent antennas embedded in a display.

A plurality of antennas 1110S1 and 1110S2 may also be disposed on side surfaces of the electronic device 100. Antennas 1150B may additionally be disposed on a rear surface of the electronic device 100.

In some examples, referring to FIG. 2, a plurality of antennas ANT1 to ANT4 may be disposed on the front surface of the electronic device 100. Here, each of the plurality of antennas ANT1 to ANT4 may be configured as an array antenna to perform beamforming in mmWave bands. The plurality of antennas ANT1 to ANT4 configured as single antennas and/or phased array antennas for use of a radio circuit such as the transceiver circuit 250 may be mounted on the electronic device 100.

In some examples, referring to FIGS. 2 and 3, at least one signal may be transmitted or received through the plurality of antennas 1110*a* to 1110*d* corresponding to the plurality of antennas ANT1 to ANT4. In this regard, each of the plurality of antennas 1110*a* to 1110*d* may be configured as an array antenna. The electronic device may perform communication with a base station through any one of the plurality of antennas 1110*a* to 1110*a* to 1110*d*. Alternatively, the electronic device may perform Multi-input/Multi-output (MIMO) communication with a base station through two or more antennas among the plurality of antennas 1110*a* to 1110*d*.

In some examples, at least one signal may be transmitted or received through the plurality of antennas 1110S1 and 1110S2 on the side surfaces of the electronic device 100. On the other hand, at least one signal may be transmitted or received through the plurality of antennas 1110S1 and 1110S4 on the front surface of the electronic device 100. In this regard, each of the plurality of antennas 1110S1 to 1110S4 may be configured as an array antenna. The electronic device may perform communication with a base station through any one of the plurality of antennas 1110S1 to 1110S4. Alternatively, the electronic device may perform Multi-input/Multi-output (MIMO) communication with the base station through two or more antennas among the plurality of antennas 1110S1 to 1110S4.

In some examples, at least one signal may be transmitted or received through the plurality of antennas 1110*a* to 1110*d*, 1150B, and 1110S1 to 1110S4 on the front surface and/or the side surfaces of the electronic device 100. In this regard, each of the plurality of antennas 1110*a* to 1110*d*, 1150B, and 1110S1 to 1110S4 may be configured as an array antenna. The electronic device may perform communication with a base station through any one of the plurality of antennas 1110*a* to 1110*d*, 1150B, and 1110S1 to 1110S4. Alternatively, the electronic device may perform MIMO communication with a base station through two or more antennas among the plurality of antennas 1110*a* to 1110*d*, 1150B, and 1110S1 to 1110S4.

Figure 4A:
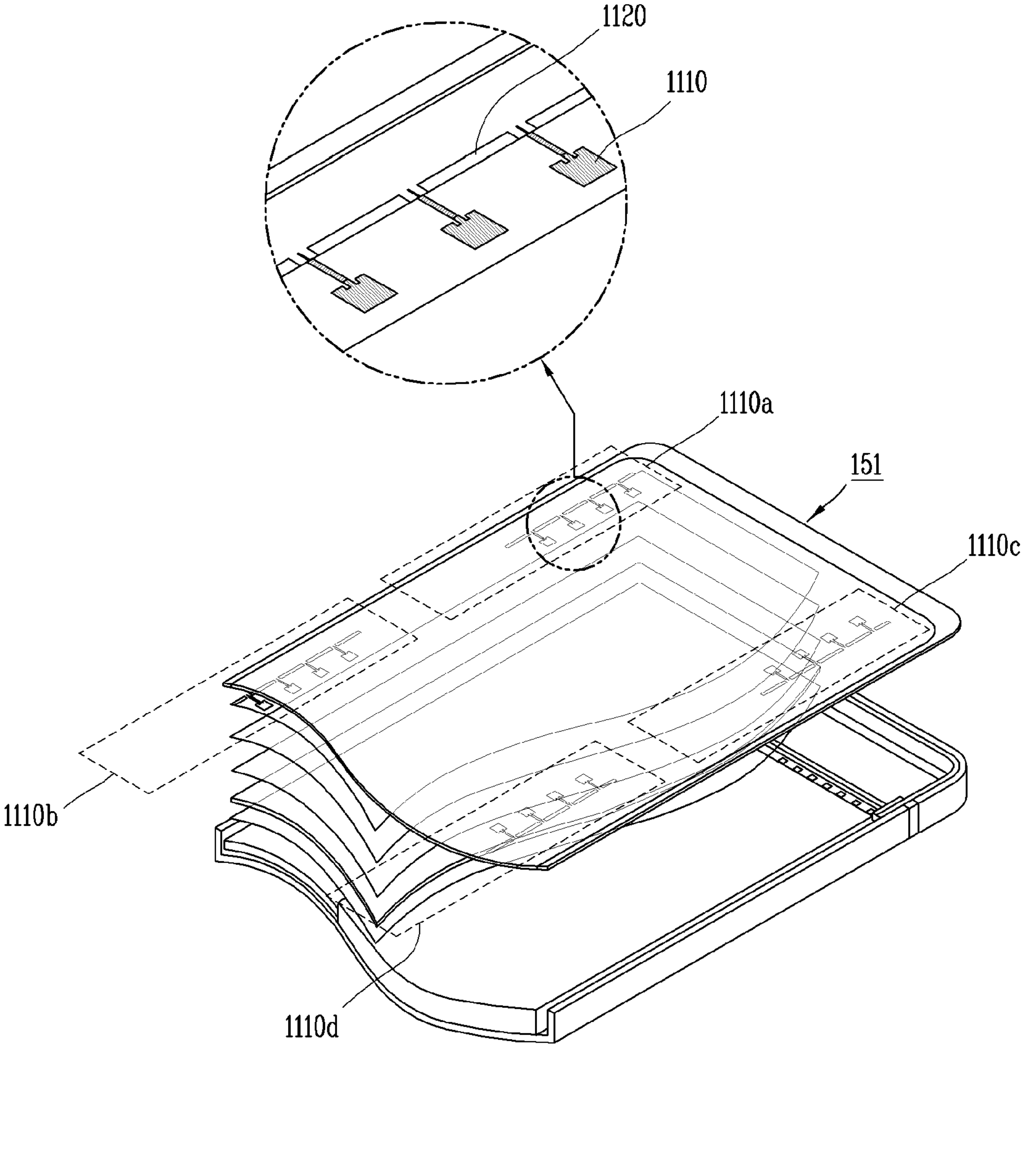
FIG. 4A illustrates an example of an electronic device having a transparent antenna and a transmission line embedded in a display.
Figure 4B:
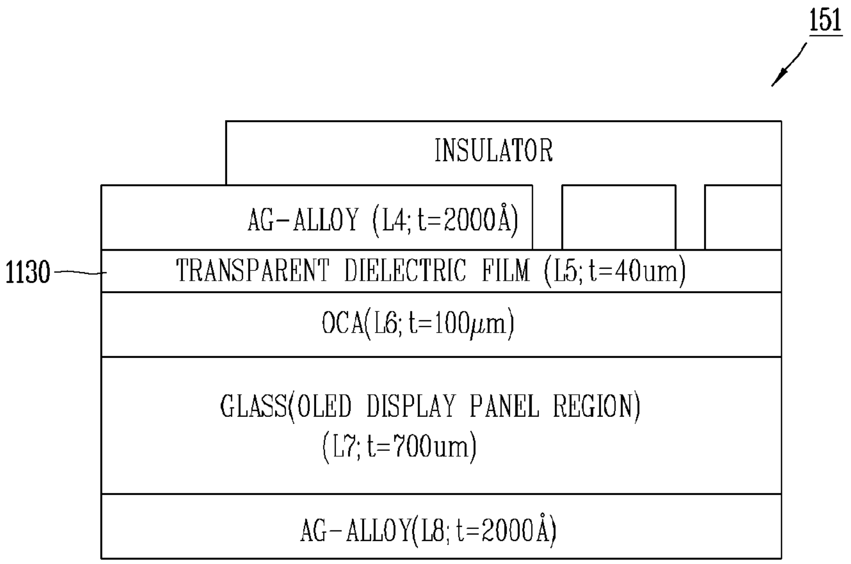
FIG. 4B illustrates a structure of a display in which the transparent antenna is embedded.

Hereinafter, an electronic device having a transparent antenna embedded in a display will be described. FIG. 4A illustrates an electronic device having a transparent antenna and a transmission line disposed in a display in accordance with an example. FIG. 4B illustrates a structure of a display in which the transparent antenna is disposed.

Referring to FIG. 4A, the electronic device may include an antenna 1110 embedded in a display 151 and a transmission line 1120 configured to feed power to the antenna 1110. Here, the display 151 may be configured as an OLED or LCD. In some examples, referring to FIGS. 3 and 4A, the electronic device may include a plurality of antennas ANT1 to ANT4 disposed in the display 151, and a transmission line 1120 to feed the antennas ANT1 to ANT4. Here, each of the plurality of antennas ANT1 to ANT4 may be implemented as an array antenna to perform beamforming. In some examples, array antennas of each of the plurality of antennas 1110*a* to 1110*d* may be spaced apart from one another to perform MIMO. In this regard, spatial beamforming may be performed so that respective beam direction by the plurality of antennas ANT1 to ANT4 are substantially orthogonal to one another.

In this regard, the antenna elements of each of the plurality of array antennas ANT1 to ANT4 may be formed as metal meshes disposed in one direction to improve visibility. In this regard, a metal mesh line formed in an oblique direction of a specific angle may be disposed inside each antenna element of each of the plurality of array antennas ANT1 to ANT4. However, the present disclosure may not be limited thereto, and a metal mesh line formed in a horizontal direction or a vertical direction may be disposed inside each antenna element.

In this regard, four antenna elements may implement one array antenna as illustrated in FIG. 4A. However, the present disclosure may not be limited thereto, and the array antenna may be implemented as a 2×1, 4×1, or 8×1 array antenna. Also, beamforming may be performed not only in one axial direction, for example, a horizontal direction, but also in another axial direction, for example, a vertical direction. To this end, the array antenna may change to a 2×2, 4×2, 4×4, or 2×4 array antenna. Beamforming can be performed in the mmWave bands using such array antennas.

In some examples, in the electronic device having the transparent antenna, the transparent antenna may operate in the Sub6 band. The transparent antenna operating in the Sub6 band may not be provided in the form of the array antenna. Therefore, the transparent antenna operating in the Sub6 band may be configured such that single antennas are spaced apart from one another to perform MIMO.

Accordingly, instead of the structure in which the patch antennas of FIG. 4A is disposed in the form of an array antenna, patch antennas as single antennas may be disposed at upper left, lower left, upper right, and lower right sides of the electronic device, and each patch antenna may perform MIMO.

Hereinafter, a display structure having transparent antennas therein will be described. Referring to FIG. 4B, a dielectric 1130, that is, a dielectric substrate, may be disposed on an OLED display panel and an OCA inside the display 151. Here, the dielectric 1130 in the form of a film may be used as the dielectric substrate of the antenna 1110. In addition, an antenna layer may be disposed on the dielectric 1130 in the form of the film. Here, the antenna layer may be made of alloy (Ag alloy), copper, aluminum, or the like. In some examples, the antenna 1110 and the transmission line 1120 of FIG. 4A may be disposed on the antenna layer.

Figure 5:
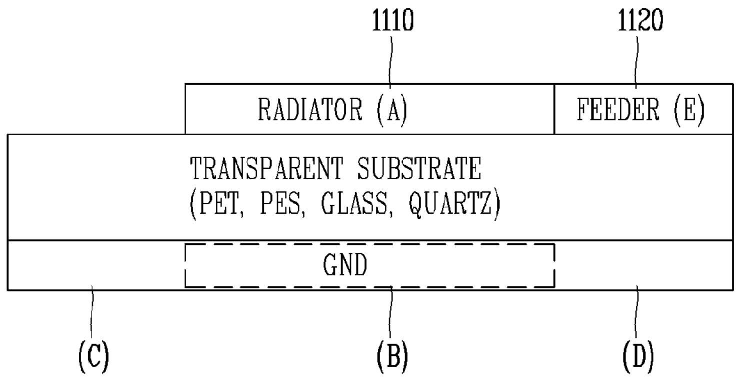
FIG. 5 illustrates a layered structure of the transparent antenna.
Figure 6:
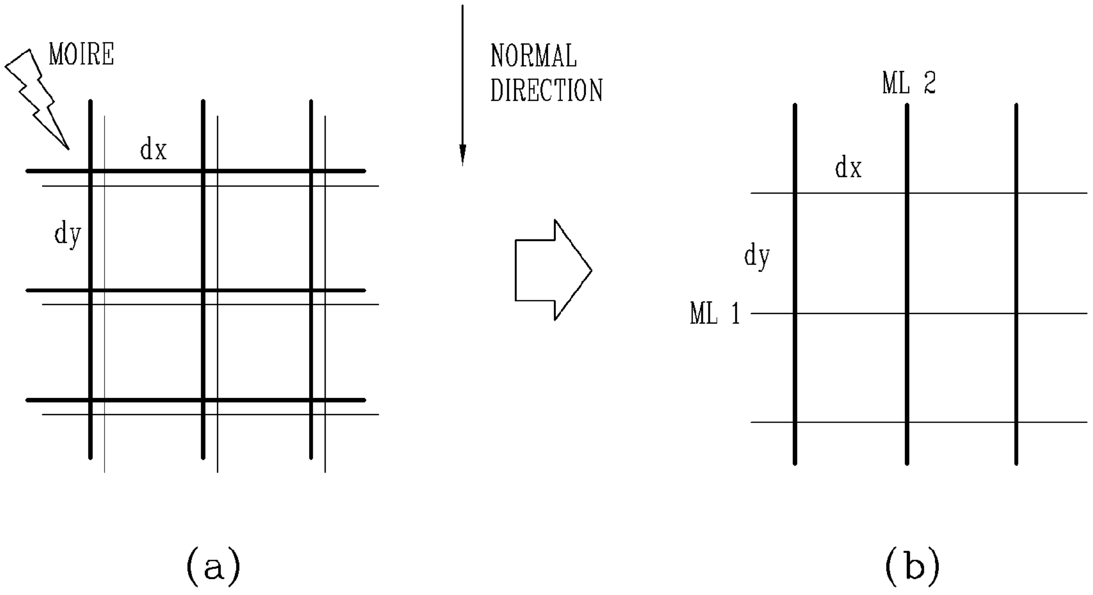
FIG. 6 illustrates that the moiré phenomenon is prevented in a normal direction when different shapes of metal meshes are arranged on an antenna and a ground layer.
Figure 7:
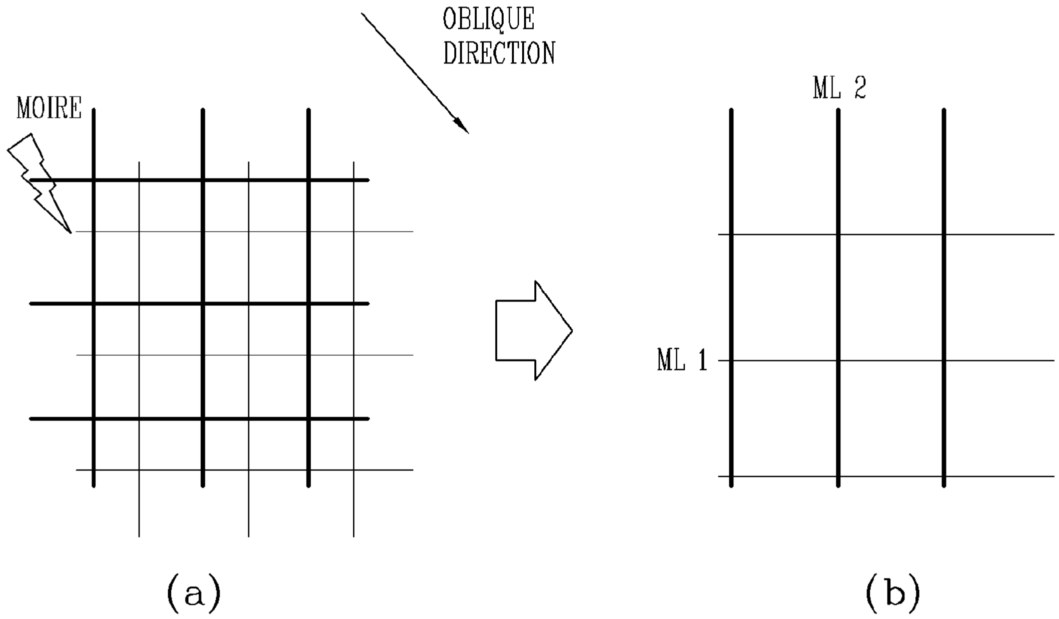
FIG. 7 illustrates that the moiré phenomenon is prevented in an oblique direction when different shapes of metal meshes are arranged on the antenna and the ground layer.

Referring to FIGS. 4A and 4B, the transparent antenna may be configured such that the inside of a patch antenna has a metal mesh grid structure. FIG. 5 illustrates a layered structure of the transparent antenna. FIGS. 6 and 7 illustrate a layered structure for preventing the moiré phenomenon in the transparent antenna. Specifically, FIG. 6 illustrates that the moiré phenomenon is prevented in a normal direction when different shapes of metal meshes are arranged on an antenna and a ground layer. FIG. 7 illustrates that the moiré phenomenon is prevented in an oblique direction when the different shapes of metal meshes are arranged on the antenna and the ground layer.

Referring to FIGS. 6 and 7, an aspect of the present disclosure is to mitigate the moiré phenomenon by dispersing wires (i.e., metal meshes) constituting a unit grid on different layers. The moiré phenomenon may also be referred to as interference fringes, moiré fringes, and lattice fringes. This moiré phenomenon refers to fringes that are revealed according to a difference in cycles when regularly repeating shapes are repeatedly overlaid several times.

Referring to FIG. 5 and (a) of FIG. 6, the metal mesh of the antenna 1110 disposed on an antenna layer and the metal mesh on a ground layer GND may be configured in the same shape. In this regard, the metal mesh inside the antenna 1110 may include both metal mesh lines in a first direction and metal mesh lines in a second direction. The metal mesh of the ground layer GND may also include both metal mesh lines in the first direction and metal mesh lines in the second direction. Here, in the case of a metal mesh having a rectangular grid structure, the metal mesh lines in the first direction and the second direction may be metal mesh lines in a horizontal direction and metal mesh lines in a vertical direction, respectively.

In some examples, the metal mesh lines may not be limited to the rectangular grid structure, and may be formed in a diamond structure or any polygonal structure depending on applications. In the diamond structure or the arbitrary polygonal structure, the metal mesh lines in the first direction and the second direction may be lines in arbitrary different directions, respectively. Hereinafter, the metal mesh lines in the first direction and the second direction in the diamond structure or the arbitrary polygonal structure will be described in detail.

In some examples, referring to (a) of FIG. 6, a unit grid size of the metal mesh of the antenna 1110 disposed on the antenna layer and the metal mesh of the ground layer GND may be indicated by dx and dy. When the mesh structure such as the metal mesh lines is applied to a plurality of layers, the moiré phenomenon may occur. This may cause a problem in visibility of the transparent antenna disposed in the display. In some examples, as illustrated in FIG. 5, the patch antenna 1100 disposed on the dielectric 1130 may have a double-sided structure in which the ground is disposed beneath the dielectric 1130. When the patch antenna 1100 having the double-sided structure is implemented using the mesh lines, the moiré phenomenon may occur significantly. In this regard, when both the patch antenna 1100 and the ground layer GND are configured to have the same shape and size, the moiré phenomenon may occur more seriously. In particular, when an alignment error occurs between the metal mesh lines of the antenna 1100 and the metal mesh lines of the ground layer GND, the moiré phenomenon may occur in terms of a viewing angle (or electromagnetic wave) in the vertical direction.

Referring to FIG. 5 and (b) of FIG. 6, the metal mesh lines of the antenna 1110 disposed on the antenna layer may only include mesh lines ML1 in the first direction, that is, in the horizontal direction. In this case, the metal mesh lines disposed on the ground layer GND may only include mesh lines ML2 in the second direction, that is, in the vertical direction.

On the other hand, the metal mesh lines of the antenna 1110 disposed on the antenna layer may only include the mesh lines ML2 in the second direction, that is, in the vertical direction. In this case, the metal mesh lines disposed on the ground layer GND may only include mesh lines ML1 in the first direction, that is, in the horizontal direction.

As described above, the moiré phenomenon can be prevented by the metal mesh lines of the antenna 1110 and the metal mesh lines of the ground layer GND that are configured as the complementary mesh lines ML1 and ML2. Accordingly, the moiré phenomenon can be prevented in terms of the viewing angle (or electromagnetic wave) in the vertical direction.

In some examples, referring to FIG. 5 and (a) of FIG. 7, in terms of a viewing angle (or electromagnetic wave) in an oblique direction, even when an alignment error of the metal mesh structure occurs slightly, it can be considered that the error between the mesh lines becomes larger. Therefore, when the alignment error occurs between the metal mesh lines of the antenna 1100 and the metal mesh lines of the ground layer GND, the moiré phenomenon may occur more seriously in terms of the viewing angle (or electromagnetic wave) in the vertical direction.

In order to prevent the moiré phenomenon, a complementary metal mesh line structure as illustrated in (b) of FIG. 6 and (b) of FIG. 7 may be applied.

Referring to FIG. 5 and (b) of FIG. 7, the metal mesh lines of the antenna 1110 disposed on the antenna layer may only include mesh lines ML1 in the first direction, that is, in the horizontal direction. In this case, the metal mesh lines disposed on the ground layer GND may only include mesh lines ML2 in the second direction, that is, in the vertical direction.

On the other hand, the metal mesh lines of the antenna 1110 disposed on the antenna layer may only include the mesh lines ML2 in the second direction, that is, in the vertical direction. In this case, the metal mesh lines disposed on the ground layer GND may only include mesh lines ML1 in the first direction, that is, in the horizontal direction.

As described above, the moiré phenomenon can be prevented by the metal mesh lines of the antenna 1110 and the metal mesh lines disposed on the ground layer GND that are configured as the complementary mesh lines ML1 and ML2. Accordingly, the moiré phenomenon can be prevented in terms of the viewing angle (or electromagnetic wave) in the oblique direction.

Figure 8:
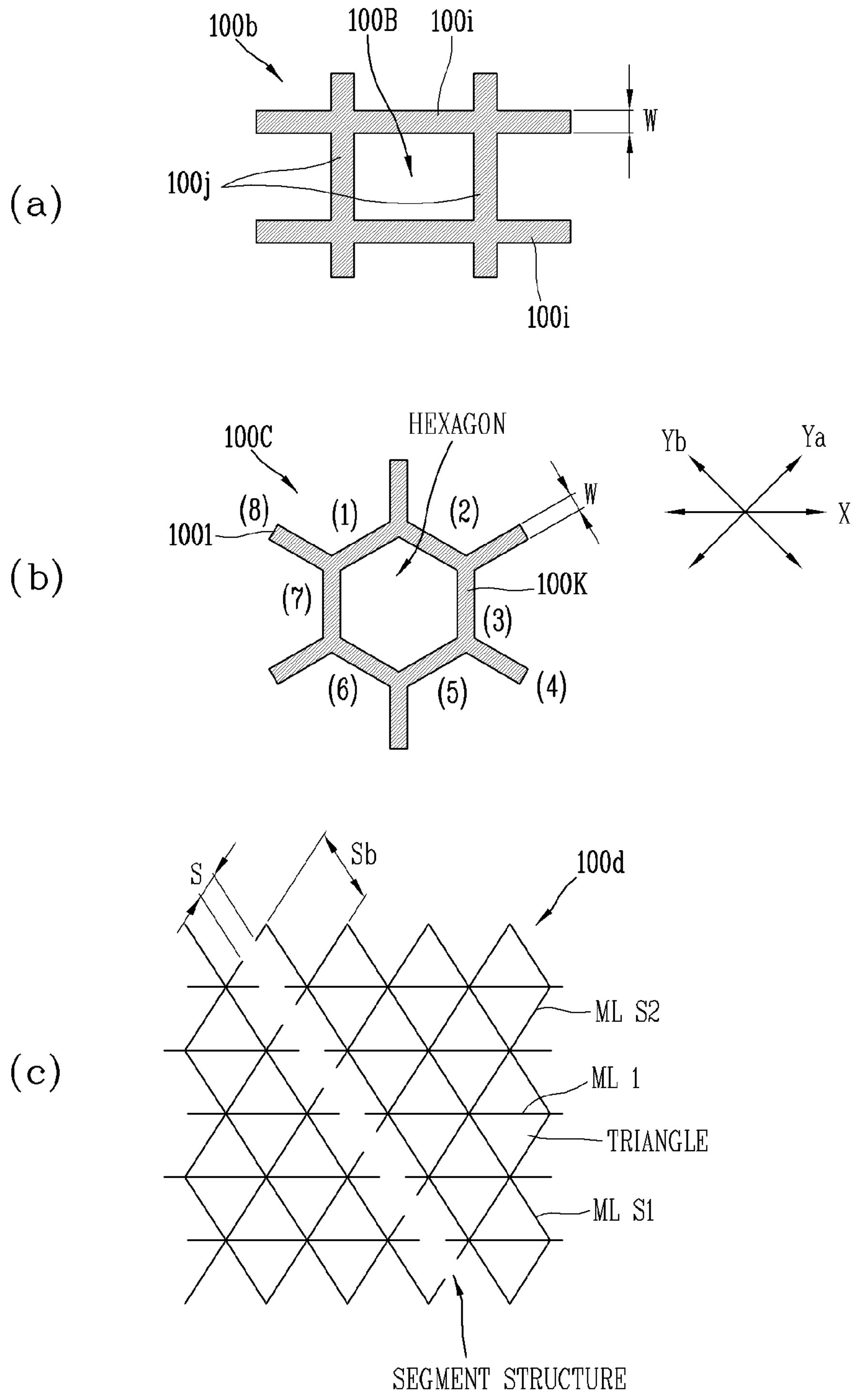
FIG. 8 illustrates a rectangular wire pattern, a hexagonal wire pattern, and a triangular wire pattern derived from a diamond wire pattern.

In some examples, the complementary metal mesh structure can also be used for any polygonal mesh structure in addition to the rectangular mesh and the diamond mesh. FIG. 8 illustrates a rectangular wire pattern, a hexagonal wire pattern, and a triangular wire pattern derived from a diamond wire pattern.

Referring to (a) of FIG. 8, a unit cell 100*b* of a rectangular wire pattern corresponding to a rectangular mesh structure may include horizontal lines 100*i* and vertical lines 100*j* each having a line width w. Depending on an application, the line widths w of the horizontal line 100*i* and the vertical line 100*j* may be set differently. In some examples, the horizontal lines 100*i* and the vertical lines 100*j* may correspond to the first metal mesh lines ML1 in the first direction and the second metal mesh lines ML2 in the second direction, respectively.

In this regard, the first metal mesh lines ML1 corresponding to the horizontal lines 100*i* and the second metal mesh lines ML2 corresponding to the vertical lines 100*j* may be disposed on different layers. For example, the antenna 1100 may be formed by the first metal mesh lines ML1 corresponding to the horizontal lines 100*i*, and an inner region B of the ground layer GND may be formed by the second metal mesh lines ML2 corresponding to the vertical lines 100*j*. As another example, the antenna 1100 may be formed by the second metal mesh lines ML2 corresponding to the horizontal lines 100*j*, and the inner region B of the ground layer GND may be defined by the first metal mesh lines ML1 corresponding to the horizontal lines 100*i*. In some examples, a region 100B defined by the horizontal lines 100*i* and the vertical lines 100*j* arranged on different layers may be determined according to a wavelength of an operating frequency. For example, the size of a unit cell region 100B1 may be determined such that a predetermined number or more of metal mesh lines are disposed inside the antenna 1100 of the mmWave band.

On the other hand, referring to (b) of FIG. 8, a unit cell 100*c* of a hexagonal wire pattern corresponding to a hexagonal mesh structure may include a hexagonal structure implemented by a plurality of mesh lines 100*k*. The unit cell 100*c* may further include a plurality of mesh lines 100*l* extending from each vertex of the hexagonal structure. Here, the plurality of mesh lines 100*l* may form different hexagonal structures.

Here, lines in the first direction among the plurality of mesh lines 100*k* and 100*l* may be disposed on the antenna 100, and the remaining lines in the second direction may be disposed on the ground layer GND. Lines formed at a left side with respect to one axis (e.g., Yb axis) may be disposed on the antenna 100, and lines formed at a right side may be disposed on the ground layer GND. For example, a first group of mesh lines corresponding to a region including (1) to (4) among the plurality of mesh lines 100*k* and 100*l* may be disposed on the antenna layer 100. On the other hand, a second group of mesh lines corresponding to a region including (5) to (8) among the plurality of mesh lines 100*k* and 100*l* may be disposed on the ground layer GND.

Referring to (c) of FIG. 8, horizontal lines ML1 may be added to the mesh lines of the diamond structure. Accordingly, triangular mesh lines 100*d* can be implemented. Accordingly, a mesh configuration with mesh lines having a triangular shape in which one side has a length of Sb. In this regard, first metal mesh lines MLS1 in the first direction may be disposed on the antenna 1110, and second metal mesh lines MLS2 in the second direction may be disposed on the ground layer GND.

In some examples, horizontal lines ML1 may be further disposed on the antenna 1110 to improve conductivity. Alternatively, the horizontal lines ML1 may be disposed on another antenna layer. In this regard, a second transparent substrate may additionally be disposed on a top of the antenna 1100, and a second antenna may be disposed on a top of the second transparent substrate. Here, the second antenna may include therein a metal mesh of the horizontal lines ML1. Accordingly, bandwidth characteristics can be further improved according to a stack structure of the second antenna disposed on the top of the antenna 1100. Radiation efficiency can also be further improved by the antenna of the stack structure. As such, electrical characteristics such as the antenna efficiency can be improved through the stack structure, and also the moiré phenomenon can be prevented by virtue of absence of overlaid metal mesh lines among the antenna layer, the second antenna layer, and the ground layer.

In some examples, some of the triangular mesh lines may be implemented as a segment structure electrically isolated from each other at a predetermined distance S. Accordingly, an antenna region can be selectively defined in the plurality of triangular mesh line structures. In the case of a configuration without a dummy pattern, the predetermined distance S from a boundary of one triangular mesh line to a boundary of another triangular mesh line may be increased by a distance between antenna elements.

Figure 9A:
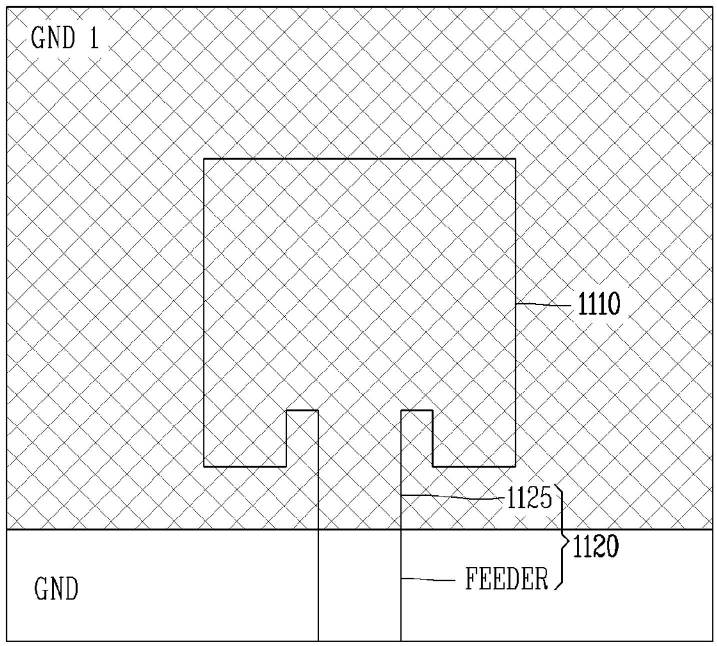
FIGS. 9A to 9C illustrate an overall layer structure and a structure for each layer in a transparent antenna unit having a metal mesh structure.
Figure 9B:
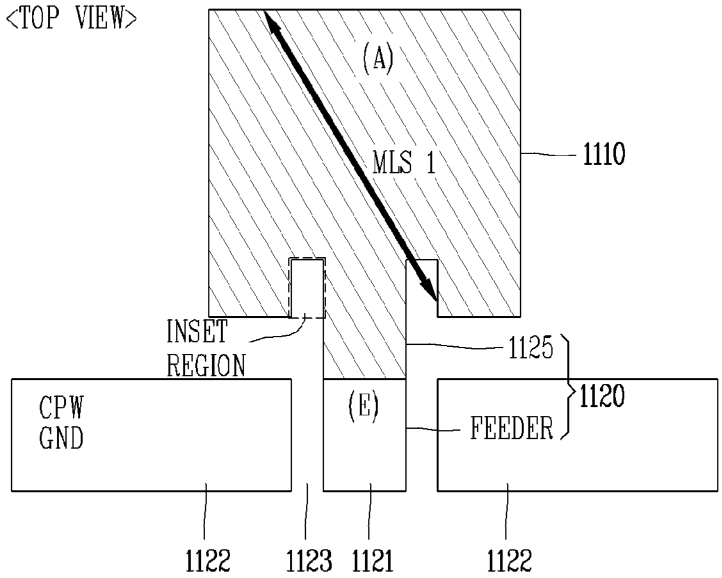
Figure 9C:
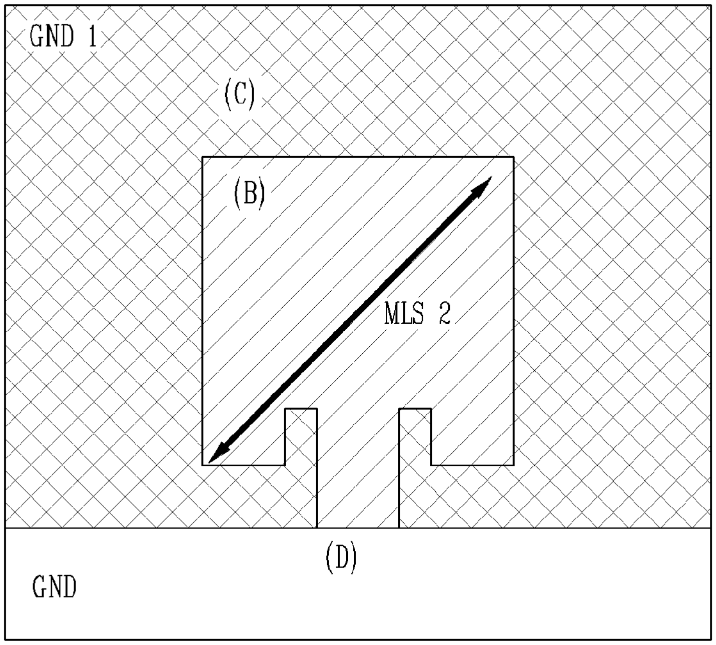

In some examples, referring to FIG. 5, the transparent antenna unit formed in the multi-layered structure may include an antenna 1110 corresponding to a radiator, a feeder, a substrate 1130, and a ground layer GND. FIGS. 9A to 9C illustrate an overall layer structure and a structure for each layer in a transparent antenna unit having a metal mesh structure. Specifically, FIG. 9A illustrating an antenna layer and a ground layer having different metal mesh shapes. FIG. 9B illustrates an antenna layer having a metal mesh shape formed in one direction. FIG. 9C illustrates a ground layer having a metal mesh shape formed in another direction.

Hereinafter, technical characteristics of the transparent antenna unit including the antenna 1110, the feeder, the substrate 1130, and the ground layer GND will be described, with reference to FIGS. 5 and 9A to 9C.

1) The transparent antenna unit is a transparent antenna having a multi-layered structure (Radiator/Feeder: 1st layer, Ground: 2nd layer) and including metal mesh lines therein.

2) Region A and a part of the ground region corresponding to a shadow region of the region A are configured such that meshes are mis-aligned from each other.

3) Region C, which is an outer region of the antenna region, in the ground region is configured in a mesh structure having regular polygonal unit cells, as illustrated in FIGS. 9A and 9C, when viewed from a normal direction. In addition, the region A as the antenna region and Region B corresponding to the region A are configured in a mesh structure having regular polygonal unit cells, as illustrated in FIG. 9A, when viewed from the normal direction.

4) Regions D and E are configured in a mesh structure or a solid structure (a region filled with metal, that is, a region where microstrip lines are formed).

5) Region F is implemented as a transparent substrate (dielectric).

6) A transparent dielectric material or an oxide conductor that lowers light reflection of mesh lines (e.g., ITO, IZTO, etc.) may be attached to (i.e., deposited or coated on) an outer metal layer.

7) The mesh structure can be expanded to any polygonal shape in addition to the rectangle/diamond.

In this regard, the antenna 1110 may be disposed inside the display, and include therein first metal mesh lines MLS1 formed in the first direction. Further, the substrate 1130 may have the antenna 1110 disposed thereon and serve as a dielectric for the antenna 1110. Here, the substrate 1130 may be implemented as a transparent substrate such as PET, PES, Glass, Quartz, etc. for transparency. In some examples, the ground layer GND may be disposed beneath the substrate 1130 and configured to serve as a ground for the antenna 1110. Here, second metal mesh lines MLS2 formed in the second direction different from the first direction may be disposed in an inner region of the ground layer GND corresponding to a region where the antenna 1110 is disposed.

Here, a shape in which the first metal mesh lines MLS1 and the second metal mesh lines MLS2 are combined may be a diamond shape. That is, the first metal mesh lines MLS1 and the second metal mesh lines MLS2 may be formed in different directions defining a diamond structure, that is, in the first direction and the second direction.

On the other hand, the diamond shape in which the first metal mesh lines MLS1 and the second metal mesh lines MLS2 are combined may have the same grid size as the diamond shape formed at the outer region C, not the inner region B, of the ground layer GND. Accordingly, when the antenna 1110 and the ground layer GND are combined with each other, the metal mesh lines may seem to be continued even in boundary regions. Specifically, for all of the outer region C, the antenna region A, and the inner region B, the metal mesh lines may be continuously formed without disconnected points at all vertices of the diamond structure. Accordingly, the complementary mesh structure can be continuously formed in all regions, thereby preventing the moiré phenomenon and improving visibility.

Meanwhile, the shapes of the first and second metal mesh lines may not be limited thereto, and the first and second metal mesh lines may alternatively be formed in a rectangular shape or an arbitrary polygonal shape depending on applications. As an example, the first and second metal mesh lines, as illustrated in FIGS. 6 and 7, may be defined by the mesh lines ML1 in the first direction, namely, the horizontal direction and the mesh lines ML2 in the second direction, namely, the vertical direction. Accordingly, the shape in which the first metal mesh lines ML1 and the second metal mesh lines ML2 are combined may be the rectangular shape. In this regard, the rectangular shape in which the first metal mesh lines ML1 and the second metal mesh lines ML2 are combined may have the same grid size as the rectangular shape formed at the outer region C, not the inner region B, of the ground layer GND. Accordingly, when the antenna 1110 and the ground layer GND are combined with each other, the metal mesh lines may seem to be continued even in boundary regions. Specifically, for all of the outer region C, the antenna region A, and the inner region B, the metal mesh lines may be continuously formed without disconnected points at all vertices of the rectangular structure. Accordingly, the complementary mesh structure can be continuously formed in all regions, thereby preventing the moiré phenomenon and improving visibility.

In some examples, boundaries of the antenna 1110 including the first metal mesh lines may also be implemented as metal mesh lines. In this regard, a slight difference may occur between a direction of an electric field applied from the feeder, that is, a linear direction and a direction of an electric field of the first metal mesh lines, that is, an oblique direction. However, when an inclination of the first metal mesh line is less than a critical angle, for example, 30 degrees, the loss due to a difference in polarization may not be great. It can also be advantageous to adaptively respond to a polarization change for each antenna element by using different inclinations of the first metal mesh lines.

Hereinafter, the transmission line 1120 corresponding to a feeder in the transparent antenna unit having the complementary mesh structure will be described. The transmission line 1120 may be provided to feed power to the antenna 1100 on the same layer as the antenna 1100. Specifically, an end portion of the transmission line 1120 may be connected to the antenna 1100. The end portion may include therein the metal mesh lines having the same shape as the shape in which the first metal mesh lines ML1, MLS1 and the second metal mesh lines ML2, MLS2 are combined. For example, the end portion of the transmission line 1120 may include therein the first metal mesh lines ML1, MLS1. Responsive to this, a region, which corresponds to the end portion of the transmission line 1120, of the ground layer GND may include therein the second metal mesh lines ML2, MLS2.

In some examples, referring to FIGS. 9A to 9C, a portion of the transmission lines 1120 may be disposed on a non-transparent region of the display. Accordingly, the remaining portion, other than the end portion, of the transmission line 1120 may be implemented in the form of a metal pattern (i.e., solid form) on the non-transparent region of the display. In this regard, the non-transparent region of the display may be a portion to which a bezel region or a side region of the display is connected, or a side region and a front region are connected.

In addition, the transmission line 1120 may be implemented in the form of a microstrip line or a strip line such as a Co-Planar Wavelength (CPW) line. In this regard, the transmission line 1120 disposed on the non-transparent region may be configured as a CPW line. In some examples, the transmission line 1120 disposed on the non-transparent region may include an inner conductor region 1121, an outer conductor region 1122, and a dielectric region 1123.

The inner conductor region 1121 may operate as a signal line, and the outer conductor region 1122 may be disposed adjacent to the inner conductor region 1121 and operate as a ground. Accordingly, the inner conductor region 1121 and the outer conductor region 1122 may be referred to as a stripline 1121 and a ground region 1122, respectively. The dielectric region 1123 may be located between the inner conductor region 1121 and the outer conductor region 1122. Accordingly, the transmission line 1120 may be formed in a CPW line structure.

Meanwhile, in the transparent antenna having the complementary mesh structure, since the ground layer is also formed in the metal mesh structure, a dummy pattern does not need to be formed adjacent to the antenna region. This can facilitate implementation of the antenna layer itself and the change in antenna characteristics can be robust to a manufacturing process. If dummy patterns are disposed at predetermined distances near the antenna 1100 in the antenna layer, antenna characteristics may change depending on a distance error from the dummy patterns.

The present disclosure proposes a transparent antenna having a complementary mesh structure, in which the change in antenna characteristics is robust to a manufacturing process, while improving visibility by prevention of the moiré phenomenon. In this regard, an outer region of a region where the antenna 1100 is disposed may be defined as a dielectric region without a metal mesh line.

Meanwhile, referring to FIGS. 5 to 9C, for the complementary mesh structure, a ground layer GND1 should be configured such that an inner region B corresponding to the antenna 1100 and an outer region C have different mesh structures. In this regard, the antenna 1100 may include therein first metal mesh lines ML1, MLS1 formed in the first direction. On the other hand, the second metal mesh lines MLS1, ML1 formed in the second direction may be disposed at the inner region B of the ground layer GND corresponding to a region A where the antenna 1100 is disposed. In addition, the first metal mesh lines ML1, MLS1 formed in the first direction and the second metal mesh lines ML2, MLS2 formed in the second direction may be connected and disposed at the outer region C of the ground layer GND.

Accordingly, the first metal mesh lines ML1, MLS1 may be disposed on the antenna layer on which the antenna 1100 is disposed. In some examples, the complementary second metal mesh lines ML2, MLS2 may be disposed at the inner region B of the ground layer GND corresponding to the region A where the antenna is disposed. In addition, the first metal mesh lines ML1, MLS1 and the complementary second metal mesh lines ML2, MLS2 may be disposed at the outer region C of the ground layer GND. The moiré phenomenon of the transparent antenna can be mitigated by the complementary metal mesh structure configured such that the metal meshes are not overlaid on a plurality of layers.

In some examples, the transparent antenna unit having the complementary metal mesh structure may further include a matching unit 1125. The matching unit 1125 may be disposed between the antenna 1100 and the transmission line 1120 to feed power to the antenna 1100, and may include therein metal mesh lines.

Specifically, the matching unit 1125 and the inner region B of the ground layer GND corresponding to the matching unit 1125 may include the metal mesh lines having the same shape as the shape in which the first metal mesh lines ML1, MLS1 and the second metal mesh lines ML2, MLS2 are combined. In this regard, the matching unit 1125 may include therein the first metal mesh lines ML1, MLS1 formed in the first direction. On the other hand, the second metal mesh lines ML2, MLS2 formed in the second direction may be disposed at the inner region B of the ground layer GND corresponding to the matching unit 1125.

In some examples, since the matching unit 1125 can have the metal mesh lines, the matching unit 1125 may preferably be formed to have a short length for a low loss structure. To this end, the matching unit 1125 may be implemented in an inset shape, rather than a quarter-wavelength impedance transformer, between the transmission line 1120 and the antenna 1110.

Accordingly, the matching unit 1125 can be formed to have a length shorter than a quarter-wavelength, and thus can obtain a low loss characteristic. In addition, the matching unit 1125 may have the same line width (i.e., the same impedance) as the transmission line 1120 so as to prevent electrical loss at boundaries due to different line widths. Therefore, the transparent antenna unit may further include an inset region defined at a region adjacent to a boundary of the matching unit 1125 by removing parts of the first metal mesh lines ML1, MLS1 of the antenna 1110 to enable impedance matching.

The foregoing description has been given of the transparent antenna having the complementary mesh structure capable of preventing the moiré phenomenon due to overlaid mesh lines. Hereinafter, technical characteristics of the complementary mesh structure capable of preventing the moiré phenomenon due to the overlaid mesh lines will be described.

1) When the present disclosure is applied, the moiré phenomenon of an antenna configured in a metal mesh structure with two or more layers can be mitigated, thereby expecting to improve visibility.

2) When the present disclosure is applied, an antenna that is insensitive to alignment of a multi-layered mesh structure can be manufactured. Therefore, high-precision alignment of a plurality of layers is unnecessary. This can lower a difficulty of manufacturing a transparent antenna, thereby reducing manufacturing costs of the transparent antenna.

3) When the present disclosure is applied, a dummy pattern for improving visibility is unnecessary. Accordingly, reduction of antenna efficiency or characteristic sensitivity due to the dummy pattern can be prevented in advance.

4) When the present disclosure is applied, a change in transparency according to a viewing angle can be relatively reduced. Accordingly, the transparency and visibility of the antenna at various angles can be improved.

5) When the present disclosure is applied, the antenna can be reduced in size by virtue of mesh lines formed only in one direction. As such, antenna transparency can be improved by mesh lines formed only in one direction and mesh lines formed in another direction on a different layer.

6) When the present disclosure is applied, an antenna bandwidth extension effect can be obtained. A typical patch antenna has a bandwidth of <10% but the patch antenna having the complementary mesh structure has a bandwidth of about 13%.

Figure 10:
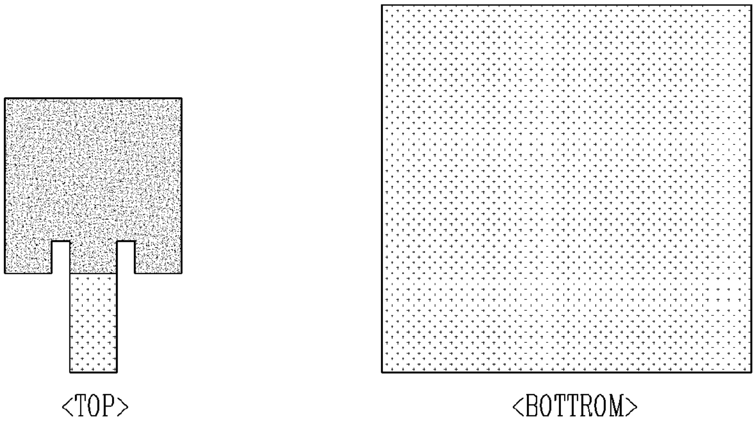
FIG. 10 illustrates patch antenna configurations of various structures.
Figure 10:
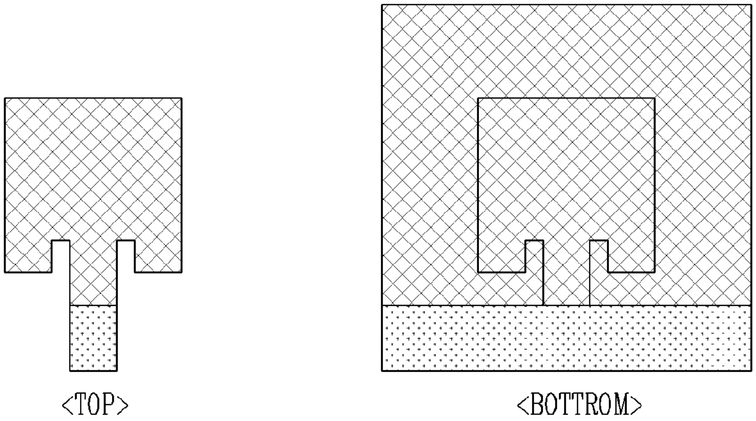
Figure 10:
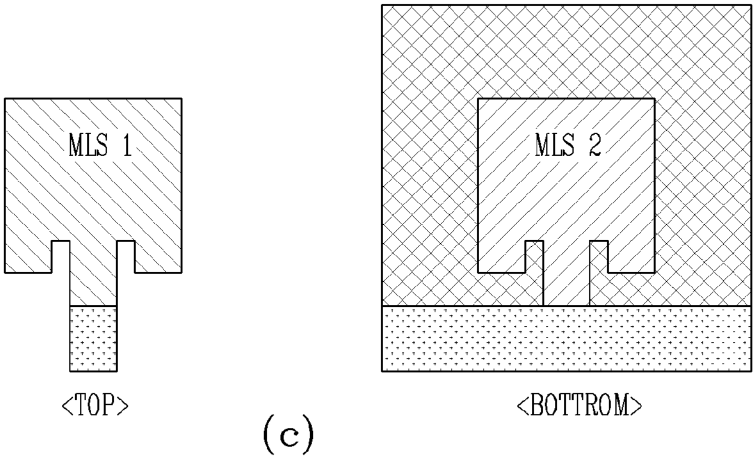

FIG. 10 illustrates a patch antenna configuration of various structures. (a) of FIG. 10 corresponds to a solid type patch antenna (Type A) filled with a metal pattern. Here, the ground layer of the patch antenna may also be implemented in the solid shape filled with the metal pattern.

(b) of FIG. 10 corresponds to a structure (Type B) in which the patch antenna has a diamond shape by the first and second metal mesh lines. Here, the ground layer may also be implemented in the structure having the diamond shape by the first and second metal mesh lines. Accordingly, the moiré phenomenon may occur due to the mesh lines overlaid at the antenna region and the ground region.

On the other hand, (c) of FIG. 10 corresponds to a structure (Type C) in which the first metal mesh lines formed in one direction are disposed in the patch antenna and the second metal mesh lines are disposed at the ground region corresponding to the antenna region. According to the complementary mesh structure, the moiré phenomenon can be mitigated in the entire antenna structure including the overlaid region between the antenna region and the ground region.

Figure 11:
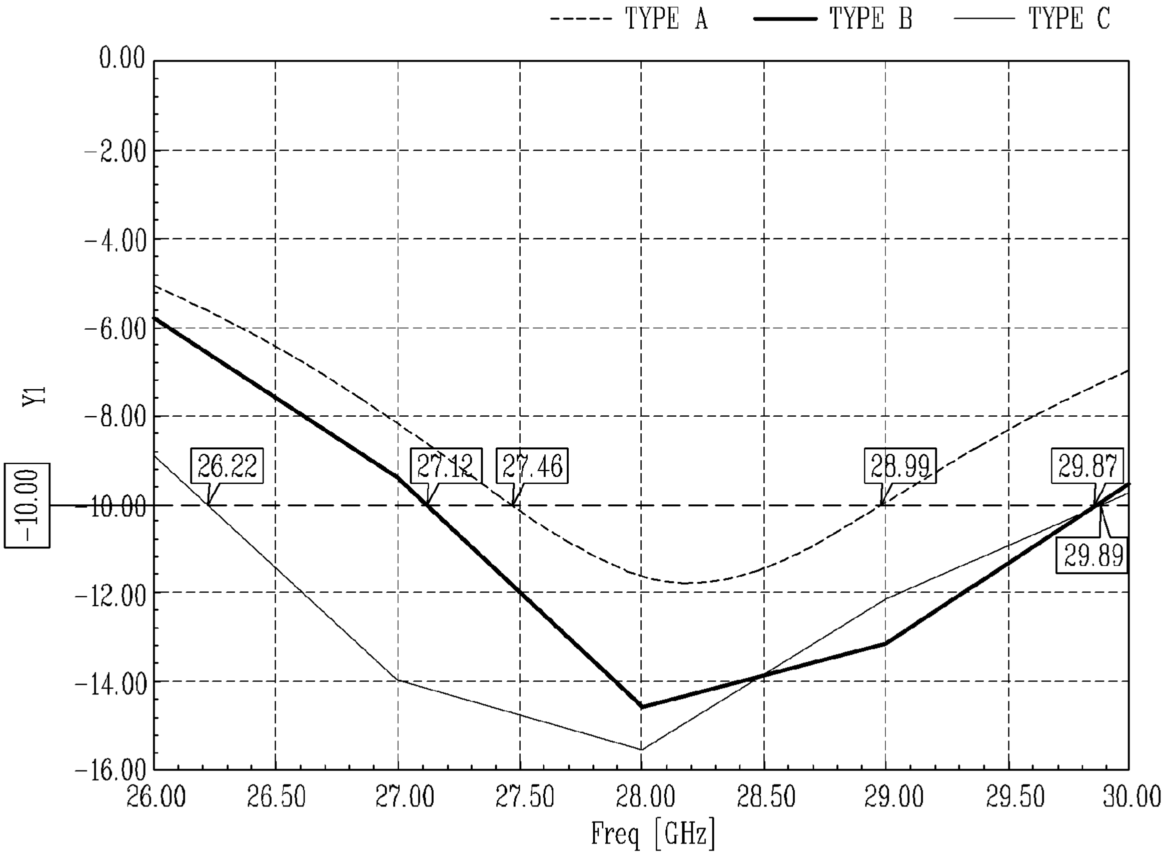
FIG. 11 illustrates comparison results of reflection coefficient characteristics according to various antenna structures.

FIG. 11 illustrates comparison results of reflection coefficient characteristics according to various antenna structures. Specifically, FIG. 11 illustrates reflection coefficient characteristics for the patch antenna having the solid metal pattern which is Type A, the transparent antenna of Type B, and the transparent antenna having the complementary mesh structure which is Type C.

Referring to FIG. 11, Type A has a bandwidth of 27.46 GHz to 28.99 GHz based on −10 dB. Type B has a bandwidth of 27.12 GHz to 29.89 GHz based on −10 dB. Type C has a bandwidth of 26.22 GHz to 29.87 GHz based on −10 dB. Therefore, the transparent antenna having the complementary mesh structure has the widest bandwidth characteristics. In this regard, the transparent antenna having the metal mesh structure has a smaller area occupied by metal per unit area than that filled with the metal pattern, and thereby its radiation efficiency is decreased. However, as the area occupied by the metal per unit area is small, frequency selectivity according to a resonance phenomenon can be alleviated, and thus the bandwidth characteristic is improved. In addition, since the transparent antenna having the complementary mesh structure has the structure in which the metal lines are partially removed from the overlaid region, the area occupied by the metal per unit area is further reduced. Accordingly, the frequency selectivity due to the resonance phenomenon can be alleviated, and thus the bandwidth characteristic is further improved. In addition, in the transparent antenna having the complementary mesh structure, the metal lines are partially removed from the overlaid region, thereby improving transparency. In this regard, the transparency may be determined by the following equation.

$$\text{Mesh transparency}-(\text{Outermost area of antenna}-\text{Area of mesh})/\text{Outermost area of antenna} \quad \text{[Equation 1]}$$

Here, the mesh pattern area may be determined in consideration of the line width and length of the metal mesh lines of the transparent antenna. In this regard, in the solid form such as Type A, the mesh pattern area is the same as the outermost area of the antenna, and the transparency is 0%. On the other hand, when only one of the first and second metal mesh lines is disposed as in Type C, the transparency is more improved than that in the case with the first and second metal mesh lines as in Type B. For example, when the transparency is 90% in the structure of Type B, the mesh pattern area corresponds to 10%. However, in the structure of Type C, since only one of the first and second metal mesh lines is disposed, the mesh pattern area is reduced to 5%. Accordingly, if the transparency is 90% in the structure of Type B, the transparency can be improved to 95% in the structure of Type C.

In some examples, Table 1 compares patch antenna sizes and electrical characteristics for the antenna structures of Type A to Type C, in which a center frequency is 28 GHz.

TABLE 1

| | Bandwidth | Patch size (mm 2) | Benefit | Radiation Efficiency | 3 dB Beamwidth (V/H) (deg) |
|---|---|---|---|---|---|
| Type A | 1.5 GHz (5.4%) | 2.2 × 2.2 | 6 dBi | −0.23 dBi (95%) | 89/99 |
| Type B | 2.75 GHz (9.8%) | 2.2 × 2.2 | 4.5 dBi | −1.31 dBi (74%) | 89/113 |
| Type C | 3.65 GHz (13%) | 1.8 × 1.8 | 3.8 dBi | −1.51 dBi (71%) | 87.5/101 |

Accordingly, in the structure of Type C having the complementary mesh structure, the bandwidth is increased by about 3% and the antenna size is decreased by about 33%, compared to the structure of Type B. Therefore, the transparent antenna having the complementary mesh structure can be reduced in size and obtain improved bandwidth. In addition, as described above, in the transparent antenna having the complementary mesh structure, the metal lines can to be partially removed from the overlaid region, and the proportion occupied by the metal per unit area can be further reduced. Accordingly, in the structure of Type C having the complementary mesh structure, transparency can be improved and the moiré phenomenon can be mitigated, compared to the structure of Type B.

As described above, in the transparent antenna having the complementary mesh structure, the metal lines can be partially removed from the overlaid region, and the proportion occupied by the metal per unit area can be further reduced. Accordingly, the frequency selectivity due to the resonance phenomenon can be alleviated, and thus the bandwidth characteristic can be further improved. However, although the radiation efficiency or gain is somewhat reduced because the metal lines are partially removed, improvement of other electrical characteristics and antenna miniaturization can be achieved, the moiré phenomenon can be mitigated, and the transparency can be improved.

On the other hand, although the radiation efficiency is somewhat reduced due to the decrease in the proportion occupied by the metal per unit area as in the structure of Type C, this can be sufficiently compensated through array antennas having directivity in the mmWave bands.

The foregoing description has been given of the transparent antenna having the complementary mesh structure capable of preventing the moiré phenomenon due to overlaid mesh lines. Hereinafter, an array antenna structure having a complementary mesh structure for preventing the moiré phenomenon according to another aspect will be described. In this regard, the descriptions of the transparent antenna having the above-mentioned complementary mesh structure may all be applicable to array antennas having the complementary mesh structure to be described below.

Figure 12:
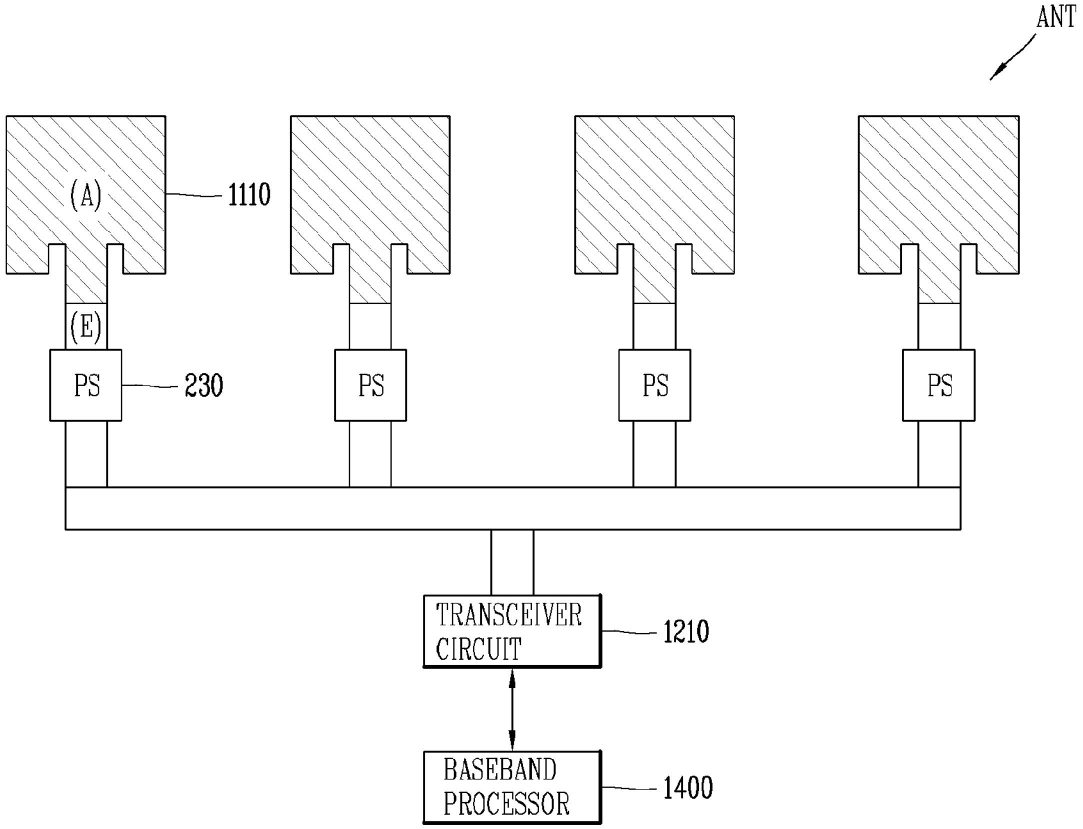
FIG. 12 illustrates a configuration of mesh lines on an antenna layer in array antennas having a complementary mesh structure.
Figure 13:
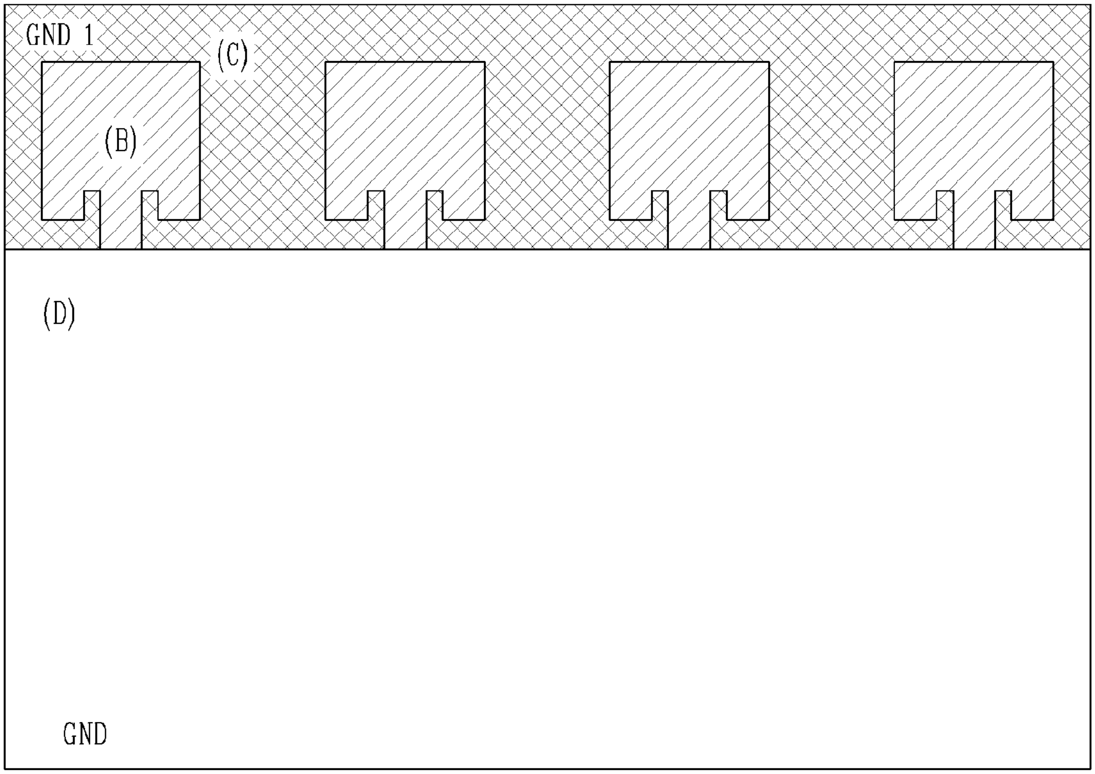
FIG. 13 illustrates a configuration of mesh lines on a ground layer in the array antennas having the complementary mesh structure.
Figure 14:
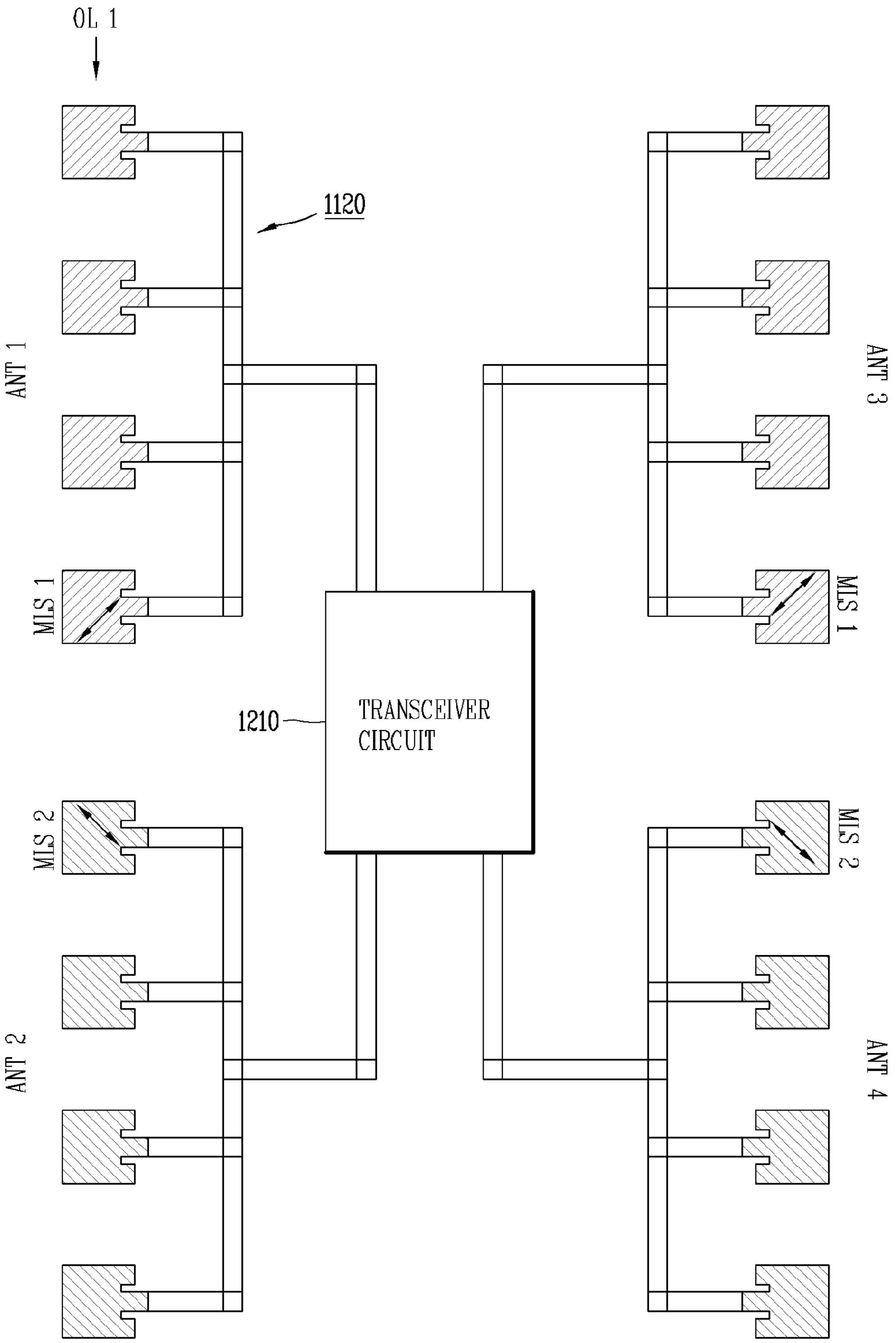
FIG. 14 illustrates a detailed configuration of an electronic device including a plurality of array antennas having the complementary mesh structure.

FIGS. 12 and 13 illustrate an array antenna having a complementary mesh structure. Specifically, FIG. 12 illustrates a mesh configuration of an antenna layer in the array antenna having the complementary mesh structure. FIG. 13 illustrates a mesh configuration of a ground layer in the array antenna having the complementary mesh structure. FIG. 14 illustrates a detailed configuration of an electronic device including a plurality of array antennas having the complementary mesh structure.

Referring to FIGS. 4A to 9C and 12 to 14, the plurality of array antennas ANT1 to ANT4 may be disposed inside the display 151 and implemented by metal mesh lines. Meanwhile, the electronic device including the transparent antenna unit may further include a ground layer GND. The ground layer GND may be disposed beneath the substrate 1100 and configured to serve (operate) as a ground for the antenna 1100.

At least one array antenna of the plurality of array antennas ANT1 to ANT4 may include therein first metal mesh lines ML1, MLS1 formed in the first direction. A remaining array antenna of the plurality of array antennas ANT1 to ANT4 may include therein second metal mesh lines ML2, MLS2 formed in the second direction different from the first direction. In this regard, the array antennas ANT1 and ANT3 disposed at a top may include the first metal mesh lines ML1, MLS1. Accordingly, the array antennas ANT2 and ANT4 disposed at a bottom may include the second metal mesh lines ML2, ML S2. Alternatively, the array antennas ANT1 and ANT2 disposed at a left side may include the first metal mesh lines ML1, MLS1. Accordingly, the array antennas ANT3 and ANT4 disposed at a right side may include the second metal mesh lines ML2, MLS2. In addition, the combination may not be limited thereto, and the mesh line shapes of the plurality of array antennas ANT1 to ANT4 may be variously changed depending on applications.

In some examples, the electronic device that includes the plurality of array antennas ANT1 to ANT4 having the complementary mesh structure may further include a transceiver circuit 1210. The transceiver circuit 1210 may be connected to the array antennas ANT1 to ANT4 through the transmission line 1120. In addition, the transceiver circuit 1210 may transmit a 5G transmission signal to the array antenna ANT1 or ANT4 and receive a 5G reception signal from the array antenna ANT1 or ANT4.

The inner region B of the ground layer GND1 corresponding to the at least one array antenna may include the second metal mesh lines ML2, MLS2 that are complementary to the mesh lines inside the antenna. On the other hand, the inner region B of the ground layer GND1 corresponding to the remaining array antenna may include the first metal mesh lines ML1, MLS1 that are complementary to the mesh lines inside the antenna.

In some examples, the array antennas ANT1 to ANT4 may have slightly different performances according to the different shapes of the first metal mesh lines ML1, MLS1 and the second metal mesh lines ML2, MLS2. Accordingly, a signal can be received through an optimal antenna according to reception signal qualities at the array antennas ANT1 to ANT4 having the complementary mesh structure.

Accordingly, when a signal received through the at least one array antenna including the first metal mesh lines ML1, MLS1 has low quality, the transceiver circuit 1210 may receive a signal through the remaining array antenna including the second metal mesh lines ML2, MLS2.

In this regard, a first signal may be transmitted to each element of the array antennas ANT1 to ANT4 through the transmission line 1120 corresponding to the feeder, such that a vertical polarization is generated, as illustrated in FIGS. 9A to 9C. On the other hand, a second signal may be transmitted to each element of the array antennas ANT1 to ANT4 through a second feeder, such that a horizontal polarization is generated.

Accordingly, a maximum of 8 Tx can be implemented using the first and second signals having the vertical and horizontal polarizations and the four array antennas ANT1 to ANT4.

In some examples, the feeder may be disposed in an optimal polarization direction according to the shapes of the metal mesh lines inside the array antennas ANT1 to ANT4. The array antennas including the first metal mesh lines ML1 formed in the horizontal direction may be fed through the second feeder to generate the horizontal polarization. On the other hand, the array antennas including the second metal mesh lines ML2 formed in the vertical direction may be fed through the feeder to generate the vertical polarization.

In some examples, array antennas including first metal mesh lines MLS1 formed in an oblique direction, namely, a first direction may be fed through a third feeder to generate polarization in the first direction. On the other hand, array antennas including second metal mesh lines MLS2 formed in another oblique direction, namely, a second direction may be fed through a fourth feeder to generate polarization in the second direction.

In some examples, when a length is longer than a width in a diamond grid structure, the first and second metal mesh lines MLS1 and MLS2 in the first and second directions of the oblique direction may have larger vertical polarization components than horizontal polarization components. Accordingly, the at least one array antenna including the first metal mesh lines MLS1 formed in the first direction and another array antenna including the second metal mesh lines MLS2 in the second direction may be configured to operate with vertical polarization. To this end, both the at least one array antenna including the first metal mesh lines MLS1 and the another array antenna including the second metal mesh lines MLS2 may all be fed through the feeder.

Accordingly, the array antennas including the first and second metal mesh lines MLS1 and MLS2 fed through the same feeder can have different reception characteristics depending on a rotated state of the electronic device. Accordingly, when a signal received through the at least one array antenna including the first metal mesh lines ML1, MLS1 has low quality, the transceiver circuit 1210 may receive a signal through the remaining array antenna including the second metal mesh lines ML2, MLS2.

In some examples, the electronic device may further include a baseband processor 1400 connected to the transceiver circuit 1210 to control the transceiver circuit 1210. Accordingly, the baseband processor 1400 may control the transceiver circuit 1210 to perform a diversity operation or a MIMO operation through the at least one array antenna and the remaining array antenna according to quality of a reception signal. Here, the at least one array antenna and the remaining array antenna may include therein the first metal mesh lines MLS1 and the second metal mesh lines MLS2, respectively.

Specifically, the baseband processor 1400 may compare a first signal quality received through the at least one array antenna including the first metal mesh lines ML1, MLS1 and a second signal quality received through the remaining array antenna including the second metal mesh lines ML2, MLS2. In this regard, the baseband processor 1400 may determine whether both the first signal quality and the second signal quality are equal to or greater than a threshold value. In this case, the baseband processor 1400 may control the transceiver circuit 1210 to perform the MIMO through the at least one array antenna ANT1 or ANT3 and the remaining array antenna ANT2 or ANT4.

In some examples, when only the first signal quality is equal to or greater than the threshold value and a difference between the first and second signal qualities is equal to or greater than a specific value, the baseband processor 1400 may receive a signal through the at least one array antenna ANT1 or ANT3 including the first metal mesh lines ML1, MLS1. On the other hand, when only the second signal quality is equal to or greater than the threshold value and the difference between the first and second signal qualities is equal to or greater than the specific value, the baseband processor 1400 may receive a signal through the remaining array antenna ANT2 or ANT4 including the second metal mesh lines ML2, MLS2.

In some examples, in the complementary mesh structure, the diamond shape in which the first metal mesh lines MLS1 and the second metal mesh lines MLS2 are combined may have the same grid size as the diamond shape formed at the outer region C, not the inner region B, of the ground layer GND.

In addition, since the metal mesh lines are not disposed at the outer region of the region where the array antennas ANT1 to ANT4 are disposed, a dummy pattern does not exist. Accordingly, antenna efficiency degradation and sensitivity to changes in antenna characteristics which may be caused due to the dummy patterns can be reduced. In this regard, the first metal mesh lines ML1, MLS1 or the second metal mesh lines ML2, MLS2 may be complementarily disposed at the inner region B of the ground layer GND corresponding to the region where the array antennas ANT1 to ANT4 are disposed. On the other hand, the first metal mesh lines ML1, MLS1 formed in the first direction and the second metal mesh lines ML2, MLS2 formed in the second direction may be connected and disposed at the outer region C of the ground layer GND.

The moiré phenomenon of the transparent antenna can be mitigated by the first metal mesh lines ML1, MLS1 of the antenna layer on which the at least one array antenna is disposed and the second metal mesh lines ML2, MLS2 on the ground layer to be complementary to the first metal mesh lines.

In addition, the moiré phenomenon of the transparent antenna can be mitigated by the second metal mesh lines ML2, MLS2 of the antenna layer on which the remaining array antenna is disposed and the first metal mesh lines ML1, MLS1 on the ground layer to be complementary to the second metal mesh lines.

The foregoing description has been given of the electronic device having the transparent antenna with the complementary mesh structure disposed in the display. Hereinafter, effects of the electronic device having the transparent antenna having the complementary mesh structure will be described.

In some implementations, visibility can be improved by mitigating the moiré phenomenon caused due to metal mesh lines overlaid on an antenna region and a ground region in a transparent antenna structure.

In some implementations, a structure exhibiting a less change in antenna characteristics due to an alignment error of metal mesh lines between different layers in a transparent antenna structure can be provided.

In some implementations, dummy metal patterns do not need to be disposed around an antenna region, which can improve antenna efficiency and reducing changes in antenna characteristics due to manufacturing errors.

In some implementations, a change in transparency according to a viewing angle can be relatively small, so that deterioration of display quality due to antennas disposed in the display can be alleviated.

In some implementations, visibility can be improved and antenna performance such as antenna bandwidth characteristics and the like can be enhanced in a transparent antenna structure.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

In relation to the aforementioned present disclosure, design and operations of an electronic device having a transparent antenna having a complementary mesh structure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180, 1210, 1250 of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device, comprising:

an antenna including therein first metal mesh lines formed in a first direction;

a substrate having the antenna disposed thereon and configured to serve as a dielectric for the antenna;

a ground layer disposed beneath the substrate and configured to serve as a ground for the antenna;

second metal mesh lines formed in a second direction different from the first direction are disposed at an inner region of the ground layer corresponding to a region where the antenna is disposed;

a transmission line configured to feed power to the antenna on a same layer as the antenna, wherein an end portion of the transmission line is connected to the antenna, the end portion including metal mesh lines having the same shape as a shape in which the first metal mesh lines and the second metal mesh lines are combined, wherein a portion of the transmission line is disposed on a non-transparent region of the device, wherein the portion of the transmission line disposed on the non-transparent region is configured as a Co-Planar Wavelength (CPW) line, and a transceiver circuit connected to the portion of the transmission line configured as the CPW line and configured to transmit a 5G transmission signal to the antenna and receive a 5G reception signal from the antenna.

2. The electronic device of claim 1, wherein the Co-Planar Waveguide (CPW) line comprises:

an inner conductor region configured to serve as a signal line;

an outer conductor region disposed adjacent to the inner conductor region and configured to serve as a ground; and a dielectric region disposed between the inner conductor region and the outer conductor region.

3. An electronic device, comprising:

an antenna including therein first metal mesh lines formed in a first direction;

a substrate having the antenna disposed thereon and configured to serve as a dielectric for the antenna;

a ground layer disposed beneath the substrate and configured to serve as a ground for the antenna; and second metal mesh lines formed in a second direction different from the first direction are disposed at an inner region of the ground layer corresponding to a region where the antenna is disposed, wherein the first metal mesh lines and the second metal mesh lines are not disposed at an outer region of the region where the antenna is disposed.

4. The electronic device of claim 3, wherein the first metal mesh lines formed in the first direction and the second metal mesh lines formed in the second direction are connected and disposed at an outer region of the ground layer.

5. An electronic device, comprising:

an antenna including therein first metal mesh lines formed in a first direction;

a substrate having the antenna disposed thereon and configured to serve as a dielectric for the antenna;

a ground layer disposed beneath the substrate and configured to serve as a ground for the antenna; and second metal mesh lines formed in a second direction different from the first direction are disposed at an inner region of the ground layer corresponding to a region where the antenna is disposed, wherein the first metal mesh lines are disposed on an antenna layer where the antenna is disposed, wherein the second metal mesh lines are complementarily disposed at the inner region of the ground layer corresponding to the region where the antenna is disposed, and wherein the first metal mesh lines and the second metal mesh lines complementary to each other are disposed at an outer region of the ground layer, so that a moiré phenomenon of a transparent antenna is reduced.

6. The electronic device of claim 1, wherein the antenna further comprises a matching unit disposed between the antenna and the transmission line to feed the power to the antenna, and wherein metal mesh lines having a same shape as a shape in which the first metal mesh lines and the second metal mesh lines are combined are disposed at the matching unit and the inner region of the ground layer corresponding to the matching unit.

7. The electronic device of claim 6, wherein an inset region is further defined at a region adjacent to a boundary of the matching unit by partially removing the first metal mesh lines of the antenna, so as to allow impedance matching.

8. An electronic device, comprising:

a plurality of array antennas including metal mesh lines;

a transceiver circuit connected to the array antennas through a transmission line, and configured to transmit a 5G transmission signal to the array antennas and receive a 5G-reception signal from the array antennas; and a ground layer disposed beneath the array antennas and configured to serve as a ground for the array antennas, wherein at least one of the plurality of array antennas includes therein first metal mesh lines formed in a first direction, wherein a remaining array antenna of the plurality of array antennas includes therein second metal mesh lines formed in a second direction different from the first direction, wherein the second metal mesh lines are disposed at an inner region of the ground layer corresponding to the at least one of the plurality of array antennas, wherein the first metal mesh lines are disposed at the inner region of the ground layer corresponding to the remaining array antenna, and wherein the transceiver circuit receives a signal through the remaining array antenna including the second metal lines when a signal received through the at least one of the plurality of array antennas including the first metal mesh lines has low quality.

9. An electronic device, comprising:

a plurality of array antennas including metal mesh lines;

a transceiver circuit connected to the array antennas through a transmission line, and configured to transmit a 5G transmission signal to the array antennas and receive a 5G reception signal from the array antennas;

a baseband processor coupled to the transceiver circuit and configured to control the transceiver circuit; and a ground layer disposed beneath the array antennas and configured to serve as a ground for the array antennas, wherein at least one of the plurality of array antennas includes therein first metal mesh lines formed in a first direction, wherein a remaining array antenna of the plurality of array antennas includes therein second metal mesh lines formed in a second direction different from the first direction, wherein the baseband processor controls the transceiver circuit to perform a diversity operation or a Multi-Input/Multi-Output (MIMO) operation through the at least one of the plurality of array antennas and the remaining array antenna when quality of a signal received through the at least one of the plurality of array antennas including the first metal mesh lines and quality of a signal received through the remaining array antenna including the second metal mesh lines are equal to or higher than a threshold value.

10. The electronic device of claim 8, wherein the first metal mesh lines and the second metal mesh lines are not disposed at an outer region of a region where the plurality of array antennas are disposed.

11. The electronic device of claim 10, wherein the first metal mesh lines or the second metal mesh lines are disposed at the inner region of the ground layer corresponding to the region where the plurality of array antennas are disposed, and wherein the first metal mesh lines formed in the first direction and the second metal mesh lines formed in the second direction are combined and disposed at an outer region of the ground layer.

12. The electronic device of claim 8, wherein a moiré phenomenon of a transparent antenna is reduced by the first metal mesh lines of an antenna layer on which the at least one of the plurality of array antennas is disposed and the second metal mesh lines disposed on the ground layer to be complementary to the first metal mesh lines, and wherein the moiré phenomenon of the transparent antenna is reduced by the second metal mesh lines of the antenna layer on which the remaining array antenna is disposed and the first metal mesh lines disposed on the ground layer to be complementary to the second metal mesh lines.

* * * * *